US011001131B2

(12) United States Patent
Letendre

(10) Patent No.: US 11,001,131 B2
(45) Date of Patent: May 11, 2021

(54) PROTECTIVE COVER FOR A VEHICLE

(71) Applicant: BOMBARDIER RECREATIONAL PRODUCTS INC., Valcourt (CA)

(72) Inventor: Caroline Letendre, Drummondville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 448 days.

(21) Appl. No.: 15/944,135

(22) Filed: Apr. 3, 2018

(65) Prior Publication Data
US 2019/0009660 A1 Jan. 10, 2019

Related U.S. Application Data

(60) Provisional application No. 62/529,523, filed on Jul. 7, 2017.

(51) Int. Cl.
*B60J 11/06* (2006.01)
*B62J 19/00* (2006.01)
B62M 27/02 (2006.01)

(52) U.S. Cl.
CPC .............. *B60J 11/06* (2013.01); *B62J 19/00* (2013.01); *B60Y 2200/252* (2013.01); *B62M 27/02* (2013.01)

(58) Field of Classification Search
CPC . B60J 11/04; B60J 11/06; B62J 19/00; B62M 27/02; B60Y 2200/252

(Continued)

(56) References Cited

U.S. PATENT DOCUMENTS 3,659,872 A * 5/1972 Warner ..................... B62J 19/00
296/78.1
5,458,945 A * 10/1995 Tall ......................... B60J 11/00
150/166

(Continued)

FOREIGN PATENT DOCUMENTS

| CA | 124175 S | 10/2008 |
| CA | 113975 S | 1/2009 |
| CA | 124240 S | 1/2009 |

OTHER PUBLICATIONS

Discount Ramps; Black Ice Snowmobile Storage Covers; retrieved from http://www.discountramps.com/snowmobile-storage-cover/p/SNC-DLXT/ on Jun. 1, 2017.

(Continued)

*Primary Examiner* — Sue A Weaver
(74) *Attorney, Agent, or Firm* — BCF LLP

(57) ABSTRACT

A protective cover for a vehicle, the protective cover including a forward portion for covering at least a portion of at least one front cowl of the vehicle when installed thereon; a rearward portion for covering at least a portion of a seat of the vehicle when installed thereon; and an intermediate portion extending between the forward portion and the rearward portion for covering at least a handlebar of the vehicle when installed thereon, the intermediate portion defining an aperture for selectively accessing the handlebar when the protective cover is installed on the vehicle, the aperture being sized, shaped, and located to allow the intermediate portion to be pushed down around the handlebar such that the handlebar extends through and above the protective cover, the vehicle being capable of being operated with the protective cover being installed thereon.

32 Claims, 23 Drawing Sheets

(58) Field of Classification Search
USPC .............. 150/167, 166; 135/88.03; 280/852;
296/78.1, 136.07, 136.1, 136.01;
235/88.01
See application file for complete search history.

(56) References Cited

U.S. PATENT DOCUMENTS

| | | | | |
|---|---|---|---|---|
| 5,562,139 | A * | 10/1996 | Cseri | B62J 19/00 |
| | | | | 150/167 |
| 5,662,372 | A * | 9/1997 | Lubkeman | A41D 3/08 |
| | | | | 296/136.04 |
| 6,129,408 | A | 10/2000 | Schultz et al. | |
| 6,468,612 | B1 | 10/2002 | Symonds | |
| 6,712,405 | B2 | 3/2004 | Desmarais et al. | |
| 6,964,448 | B2 | 11/2005 | Morin | |
| D584,212 | S | 1/2009 | Morin et al. | |
| 8,075,045 | B2 | 12/2011 | Auger | |
| 8,764,097 | B2 | 7/2014 | Fournier et al. | |
| 9,180,763 | B2 | 11/2015 | Fournier et al. | |
| 2004/0051336 | A1 * | 3/2004 | Chiao | B62J 17/065 |
| | | | | 296/78.1 |
| 2005/0146152 | A1 * | 7/2005 | Keys | B62J 23/00 |
| | | | | 296/77.1 |
| 2014/0345760 | A1 | 11/2014 | Saggau et al. | |

OTHER PUBLICATIONS

Discount Ramps; Snowmobile Covers & Accessories; retrieved from https://www.discountramps.com/snowmobile-covers/c/2420/ on Feb. 16, 2018.
DooTalk.com; Summit XM cover; retrieved from http://www.dootalk.com/forums/topic/609705-summit-xm-cover/ on Feb. 16, 2018.
Walmart; Classic Accessories 71847 Snowmobile Deluxe Travel Cover, Black/Grey; retrieved from https://www.walmart.com/ip/Classic-Accessories-71847-Snowmobile-Deluxe-Travel-Cover-Black-Grey/10802888 on Feb. 16, 2018.

* cited by examiner

PROTECTIVE COVER FOR A VEHICLE

CROSS-REFERENCE

The present application claims priority to U.S. Provisional Patent Application No. 62/529,523, entitled "Protective Cover for a Vehicle," filed Jul. 7, 2017, the entirety of which is incorporated herein by reference.

TECHNICAL FIELD

The present technology relates to protective covers for vehicles.

BACKGROUND

Certain vehicles, such as snowmobiles, all-terrain vehicles, and motorcycles, are normally covered by protective covers when being transported on or behind another vehicle, or when stored. The covers provide protection against the elements of nature, such as the sun, snow and dirt, as well as from road debris when being transported.

In order to move such a vehicle, for example when taking the vehicle from storage and loading it onto a transport vehicle, the protective cover needs to be removed so that the motor can be started and the vehicle can be steered and driven onto the transport. The protective cover then must be once again installed onto the vehicle to protect it while traveling.

It is generally inconvenient to remove and then re-install a protective cover when moving the vehicle from storage to transport or vice versa. In some situations, it can also be difficult or impossible to install or remove the protective cover from the vehicle due to the physical constraints of a storage area or a transport vehicle. For example, when transporting the vehicle in the cargo box of a pickup truck, there may not be enough room for a driver or user to be in the cargo box with the vehicle in order to easily install or remove the protective cover.

Therefore there is a need for a protective cover for a vehicle that allows the vehicle to moved while leaving the protective cover in place.

SUMMARY

One object of the present is to ameliorate at least some of the inconveniences of the prior art.

One broad aspect of the present technology provides a protective cover for a vehicle. The cover includes an aperture which allows access to the vehicle's handlebar, starter, and/or a storage compartment without having to remove the cover from the vehicle. As such, the vehicle can be moved without being required to remove the protective cover, and/or articles placed within a forward storage compartment can be retrieved without being required to remove the protective cover.

In accordance with one aspect of the present technology, there is provided a protective cover for a vehicle. The protective cover includes a forward portion for covering at least a portion of at least one front cowl of the vehicle when installed thereon; a rearward portion for covering at least a portion of a seat of the vehicle when installed thereon; and an intermediate portion extending between the forward portion and the rearward portion for covering at least a handlebar of the vehicle when installed thereon, the intermediate portion defining an aperture for selectively accessing the handlebar when the protective cover is installed on the vehicle, the aperture being sized, shaped, and located to allow the intermediate portion to be pushed down around the handlebar such that the handlebar extends through and above the protective cover, the vehicle being capable of being operated with the protective cover being installed thereon.

In some implementations, the intermediate portion is integral with the forward portion and the rearward portion.

In some implementations, the intermediate portion includes a fastener for selectively closing the aperture.

In some implementations, the fastener is at least one of a hook and loop system; a zipper; and a plurality of snaps.

In some implementations, the aperture extends laterally across the intermediate portion.

In some implementations, the aperture is at least as wide as a width of the handlebar of the vehicle.

In some implementations, the aperture extends longitudinally along a centerline of the protective cover.

In some implementations, the vehicle is a snowmobile including two front suspension assemblies connected between the vehicle body and two front skis; and the protective cover further comprises two front leg portions for covering the two front suspension assemblies, the front leg portions being connected to and extending from at least one of the forward portion and the intermediate portion.

In some implementations, the forward portion, the intermediate portion, and the rearward portion cover at least a majority of the vehicle body of the vehicle.

In some implementations, when the protective cover is installed on the vehicle and the aperture is open, at least one of a gas filler cap and a handle for a rewind starter, is further accessible via the aperture.

In accordance with another aspect of the present technology, there is provided a protective cover for a vehicle. The protective cover includes a forward portion for covering at least a portion of at least one front cowl of the vehicle when installed thereon, the forward portion passing at least partially under a vehicle body of the vehicle when installed thereon; a rearward portion for covering at least a portion of a seat of the vehicle when installed thereon; and an intermediate portion extending between the forward portion and the rearward portion for covering at least a handlebar of the vehicle when installed thereon, the intermediate portion defining an aperture for selectively accessing a portion of a top surface of the vehicle, the aperture being sized, shaped, and located to allow access a forward storage compartment of the vehicle, a handle for a rewind starter of the vehicle, and the handlebar when the protective cover is installed on the vehicle, the forward storage compartment, the handle for the rewind starter, and the handlebar being usable via the aperture when opened, the vehicle being capable of being operated with the protective cover being installed thereon.

In some implementations, the intermediate portion includes a fastener for selectively closing the aperture; and the fastener is at least one of a zipper, a hook and loop system, and a plurality of snaps.

In some implementations, the intermediate portion is integral with the forward portion and the rearward portion.

In some implementations, the aperture is a slit extending laterally across the intermediate portion.

In some implementations, the aperture is a slit extending longitudinally along a centerline of the protective cover.

In some implementations, the vehicle is a snowmobile including two front suspension assemblies connected between the vehicle body and two front skis; and the protective cover further comprises two front leg portions for covering the two front suspension assemblies, the front leg portions being connected to and extending from at least one of the forward portion and the intermediate portion.

In accordance with yet another aspect of the present technology, there is provided a protective cover for a vehicle. The protective cover includes a forward portion for covering at least a portion of at least one front cowl of the vehicle when installed thereon, the forward portion passing at least partially under a vehicle body of the vehicle when installed thereon; a rearward portion for covering at least a portion of a seat of the vehicle when installed thereon; and an intermediate portion extending between the forward portion and the rearward portion for covering at least a handlebar of the vehicle when installed thereon, the intermediate portion including a first edge and a second edge defining a slit for selectively accessing the handlebar when the protective cover is installed on the vehicle, the first edge and the second edge being connected to ends of the slit, the slit being sized, shaped, and located to allow the intermediate portion to be pushed down around the handlebar such that the handlebar extends through the slit and above the protective cover, the vehicle being capable of being operated with the protective cover being installed thereon.

In some implementations, the first edge and the second edge overlap when the slit is closed.

In some implementations, a length of the slit is greater than a width of the handlebar.

In some implementations, the intermediate portion includes a fastener for selectively closing the aperture; and the fastener is at least one of a zipper, a hook and loop system, and a plurality of snaps.

In some implementations, at least the intermediate portion is formed from at least a first material and a second material, the first and second materials being different materials; and at least one of the first material and the second material is a stretchable material.

In some implementations, the aperture is further sized, shaped, and located to allow the intermediate portion to be pushed down around at least one front headlight of the vehicle such that the handlebar and the at least one front headlight are usable with the protective cover being installed on the vehicle.

In some implementations, at least one of the intermediate portion and the rearward portion further comprises two foot-receiving portions, the two foot-receiving portions being on opposite sides of a longitudinal centerline of the cover; and each one of the two foot-receiving portions includes at least one layer of material connected to the at least one of the intermediate portion and the rearward portion for reinforcing the foot-receiving portions.

In some implementations, the two foot-receiving portions provide visual indications on the protective cover of two suggested positions for two feet of the rider on the protective cover.

In some implementations, the at least one layer of material of each one of the two foot-receiving portions is connected to an underside of the at least one of the intermediate portion and the rearward portion.

In some implementations, the at least one layer of material of each one of the two foot-receiving portions comprises at least one layer of PVC coated material.

In some implementations, each one of the two foot-receiving portions is disposed over a corresponding footrest of the vehicle when the cover is installed on the vehicle.

In some implementations, each one of the two foot-receiving portions cover at least a portion of an exterior edge of the corresponding footrest of the vehicle when the cover is installed on the vehicle.

In some implementations, the forward portion includes a headlight portion disposed generally forward of at least one headlight of the vehicle when the cover is installed on the vehicle and the headlight portion is at least partially transparent.

In some implementations, the forward portion defines at least one headlight slit selectively closed by at least one fastener and the at least one headlight slit is sized, shaped, and located to allow at least one headlight of the vehicle to be at least partially uncovered when the cover is installed on the vehicle and the at least one headlight slit is opened.

In accordance with another aspect of the present technology, there is provided a protective cover for a vehicle. The protective cover includes a forward portion for covering at least a portion of at least one front cowl of the vehicle when installed thereon, the forward portion passing at least partially under a vehicle body of the vehicle when installed thereon; a rearward portion for covering at least a portion of a seat of the vehicle when installed thereon; and an intermediate portion extending between the forward portion and the rearward portion for covering at least a handlebar of the vehicle when installed thereon, at least one of the forward portion, the rearward portion, and the intermediate portion defining an aperture for selectively accessing a portion of a top surface of the vehicle, the aperture being sized, shaped, and located to allow access a forward storage compartment of the vehicle, a handle for a rewind starter of the vehicle, and the handlebar when the protective cover is installed on the vehicle, the forward storage compartment, the handle for the rewind starter, and the handlebar being usable via the aperture when opened, the vehicle being capable of being operated with the protective cover being installed thereon.

In some implementations, the aperture defines a flap to be pulled over the handlebar to expose the handlebar when the aperture is opened.

In some implementations, the aperture is further sized, shaped, and located to allow use of the at least one front headlight with the protective cover being installed on the vehicle.

For purposes of this application, terms related to spatial orientation such as forwardly, rearwardly, upwardly, downwardly, left, and right, are as they would normally be understood by a driver of the vehicle sitting thereon in a normal riding position.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

Although the present technology is described below with respect to a snowmobile, it is contemplated that aspects could be applied to other vehicles, including, but not limited to all-terrain vehicles (ATVs), and on-road vehicles such as motorcycles.

Figure 1:
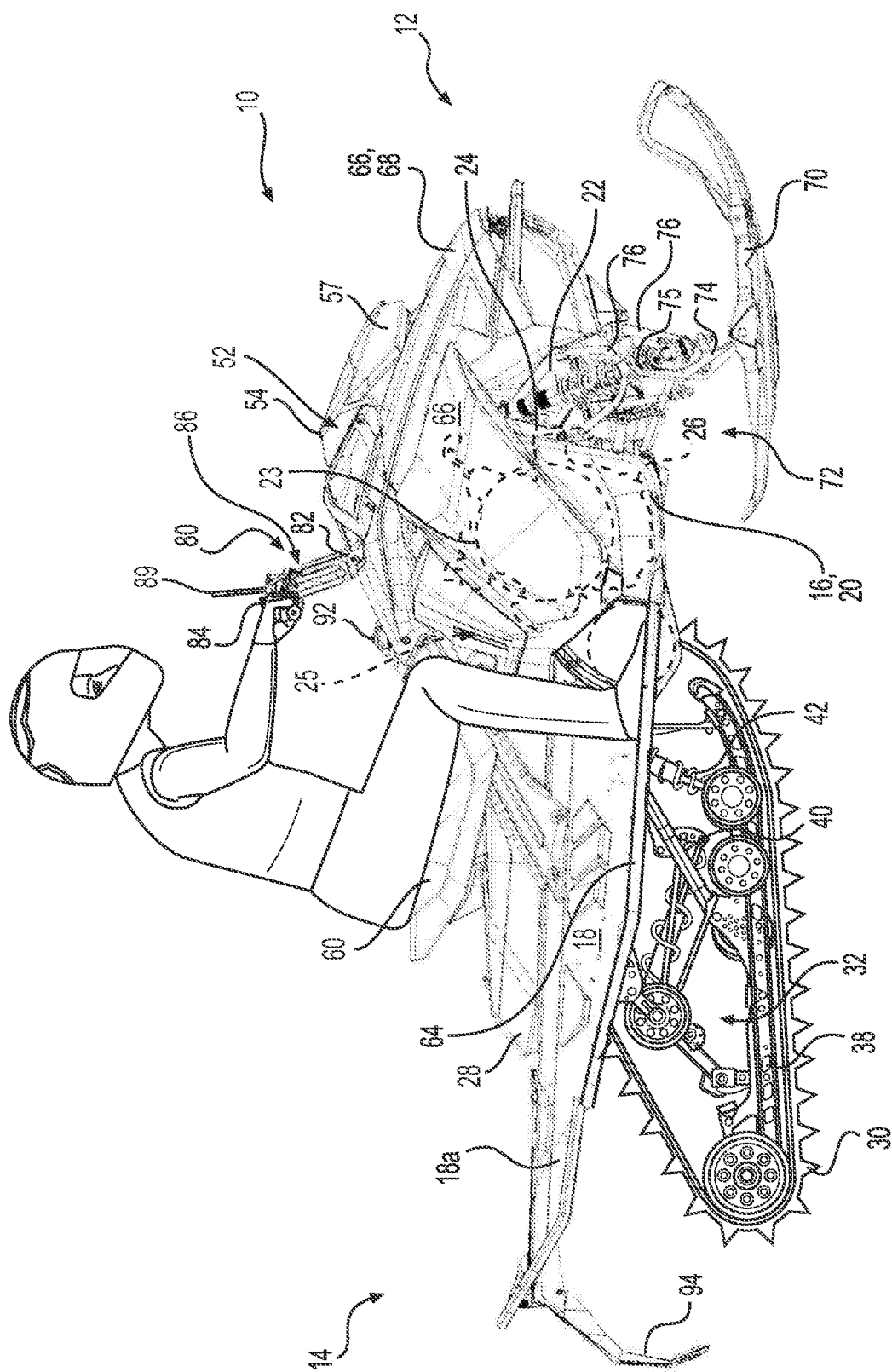
FIG. 1 is a right side elevation view of a snowmobile and a rider thereupon.

With reference to FIG. 1, a snowmobile 10 includes a front end 12 and a rear end 14 which are defined consistently with a travel direction of the vehicle 10. The snowmobile 10 includes a vehicle body 16, in the form of a frame or chassis 16, which includes a rear tunnel 18, an engine module 20, a front suspension module 22 and an upper structure 24. The tunnel 18 is formed from sheet metal parts assembled to form an inverted U-shape when viewed from the front or rear end 12, 14. The inverted U-shaped tunnel 18 has a left side portion 18a and a right side portion 18a (only the right being shown).

A motor 26, schematically illustrated in FIG. 1, is carried in an engine compartment defined by the engine module 20 of the vehicle body 16 and provides, in part, propulsion of the snowmobile 10. In the illustrated implementation, the motor 26 is an internal combustion engine 26, but it is contemplated that it could be, for example, an electric motor or a hybrid. A fuel tank 28, supported above the tunnel 18, supplies fuel to the engine 26 for its operation. A fuel tank fill opening covered by a gas filler cap 92 is disposed on the upper surface of the snowmobile 10, rearward of a handlebar 84 of the snowmobile 10. It is contemplated that the fuel tank fill opening and gas filler cap 92 could be disposed elsewhere on the snowmobile 10.

The snowmobile 10 also includes a handle 25 for a rewind starter (not shown), also referred to as a recoil starter, for starting the engine 26. The rewind starter is connected between the handle 25 and the engine 26, and is disposed below a top surface of the snowmobile 10. The handle 25 protrudes from a top surface of the vehicle body 16, rearward and rightward of the gas filler cap 92, although it is contemplated that the handle 25 could be disposed elsewhere.

An endless drive track 30 is positioned generally under the tunnel 18, and is operatively connected to the engine 26 via a drivetrain including a belt transmission system (not shown). The endless drive track 30 is driven to run about a rear suspension assembly 32 connected to the vehicle body 16 for propulsion of the snowmobile 10.

The rear suspension assembly 32 includes a pair of slide rails 38 in sliding contact with the endless drive track 30. The slide rails 38 are attached to the tunnel 18 by front and rear suspension arms 40 and one or more shock absorbers 42. It is contemplated that the snowmobile 10 could be provided with a different implementation of a rear suspension assembly 32 than the one shown herein.

A straddle seat 60 is positioned atop the fuel tank 28. The seat 60 is adapted to accommodate a driver of the snowmobile 10, as shown in FIG. 1. It is contemplated that the seat 60 could also be configured to accommodate one or more passengers. It is also contemplated that the snowmobile 10 could include an additional one or more seats for passengers. A footrest 64 is positioned on each side of the snowmobile 10 below the seat 60 to accommodate the driver's feet. Each of the left and right footrests 64 extends generally laterally outwardly from the corresponding left and right side portion of the tunnel 18. In the illustrated implementation, each side portion 18a of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, cowls 66 (also referred to as fairings 66) enclose the engine 26, the transmission system and other components of the power pack such as the air intake system. The cowls 66 include a hood 68 which can be opened to allow access to the engine 26 and other internal components of the snowmobile 10 from the top and the front which may be required, for example, for inspection or maintenance of the engine 26 and/or the power pack. The engine 26 and the transmission system are disposed between right and left side cowls 66. The side cowls 66 are both removably connected to the vehicle body 16 and/or to other cowls 66 and can be removed to access the internal components from the corresponding lateral side. The snowmobile 10 also includes a storage compartment 52 disposed forward of the seat 60. The storage compartment 52 is selectively closed by a pivotable cover 54. The snowmobile 10 also includes front headlights 57, disposed forward of the storage compartment 52, one headlight 57 being illustrated in FIG. 1.

Two skis 70 are positioned at the front end 12 of the snowmobile 10. Each ski 70 is attached to the front suspension module 22 of the vehicle body 16 through a front suspension assembly 72. Each front suspension assembly 72 includes ski legs 74, shock absorbers 75, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the vehicle body 16. The handlebar 84 is connected to the upper end of the steering column 82 via a riser block 86. A mountain strap 89 extending upwardly from the handlebar 84 is attached to the handlebar 84 centrally thereon. The handlebar 84 is positioned in front of the seat 60 and is disposed forward of the gas filler cap 92 and rearward of the pivotable cover 54 of the storage compartment 52, as can be seen in FIG. 1. The handlebar 84 is used to rotate the steering column 82, and thereby the skis 70, in order to steer the vehicle 10.

At the rear end of the snowmobile 10, a snow flap 94 extends downward from the rear end of the tunnel 18. The snow flap 94 protects against dirt that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 2:
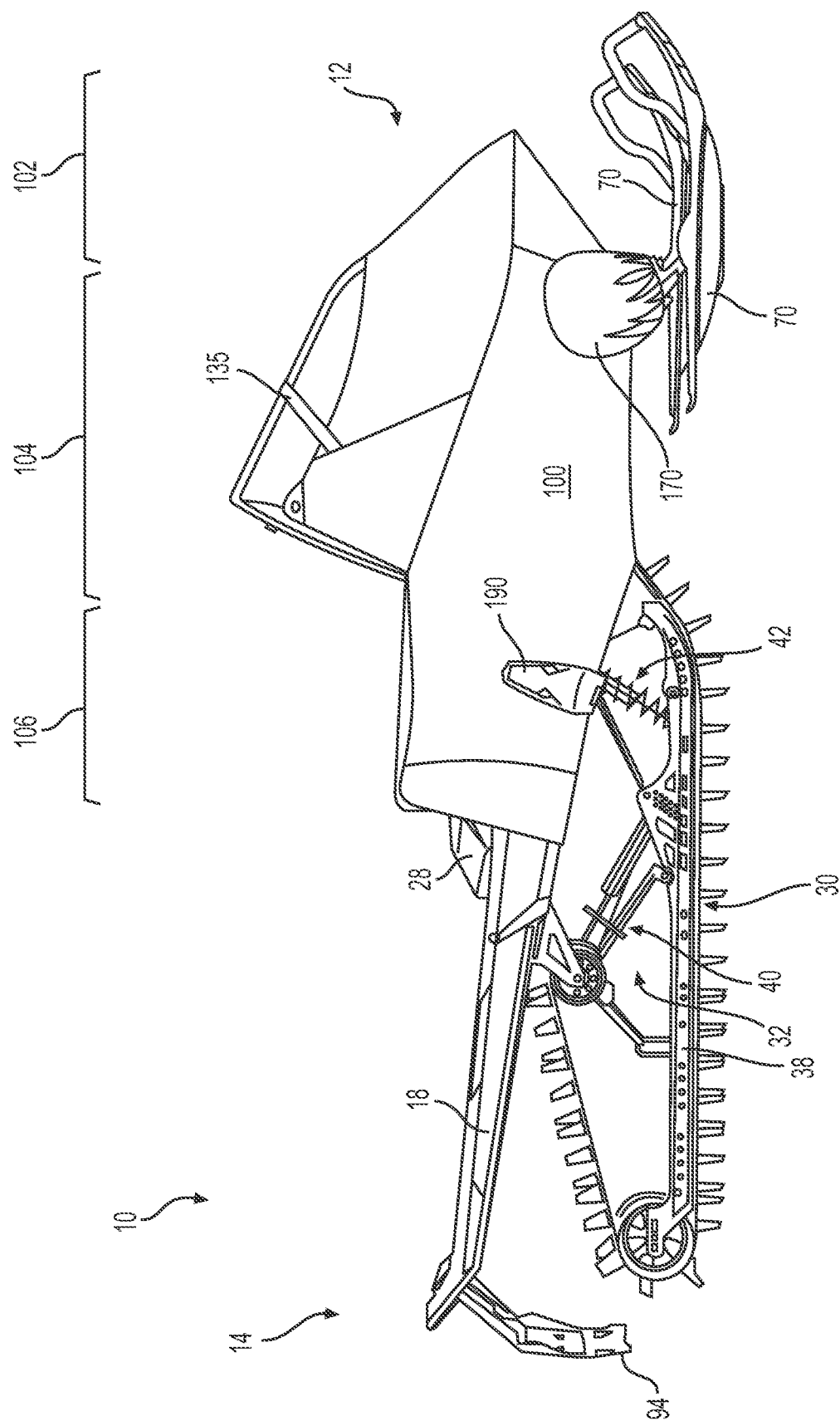
FIG. 2 is a right side elevation view of the snowmobile of FIG. 1 with a protective cover installed thereon.

With reference to FIGS. 2 to 9, a protective cover 100 for the snowmobile 10 will be described. The cover 100 is a removable protective cover that is disposed over the snowmobile 10 when stored or during transport. The cover 100 is intended to protect the snowmobile 10 from elements of nature (snow, dirt, sun, etc.). The cover 100, when covering the snowmobile as shown in FIG. 2, covers the snowmobile 10 longitudinally from the front end 12 rearward to the seat 60, and laterally from the outside edge of the left foot rest 64 to the outside edge of the right foot rest 64. It is contemplated that the cover 100 could cover more or less of the snowmobile 10.

The cover 100 is made of a water resistant polyester material, such as Polyester 600 Denier, which is also resistant to wind and to freezing temperatures. It is contemplated that some implementations of the cover 100 could be made with polyester material that is not resistant to freezing temperatures, but better resists heat and sun, for example. It is also contemplated that the cover 100 could be made of other materials such as neoprene, cotton or nylon or other similar materials. It is also contemplated that the cover 100 could be made from more than one type of material. The cover 100 is flexible and can be folded for storage of the protective cover 100 when the snowmobile 10 is in use.

The cover 100 can be generally described as having three integrally connected portions: a forward portion 102, an intermediate portion 104, and a rearward portion 106. It is contemplated that the portions 102, 104, 106 could be three cover sections that are sewn together. It is also contemplated that the cover 100 could be formed from more or less than three sections joined together. The forward, intermediate, and rearward portions 102, 104, 106 together cover a majority of the vehicle body 16, although the protective cover 100 could cover more or less of the vehicle body 16 and the snowmobile 10, as will be described further below. Depending on the implementation, it is contemplated that the forward, intermediate, and rearward portions 102, 104, 106 could be larger or smaller than the portions illustrated in the Figures. It is also contemplated that the portions 102, 104, 106 could make up different proportions of the cover 100 than illustrated.

The forward portion 102 wraps around the front end 12 of the snowmobile 10 and covers the front cowls 66. It is contemplated that the forward portion 102 could cover less of the vehicle body 16 in different implementations.

The forward portion 102 includes two front leg portions 170 to cover the two front suspension assemblies 72. The leg portions 170 could cover more or less of the front suspension assemblies 72 than illustrated, although the front skis 70 will remain uncovered. In some implementations, the leg portions 170 could be omitted, and the forward portion 102 could extend down over the front suspension assemblies 72. It is also contemplated that the cover 100 may not cover the front suspension assemblies 72 in some implementations. It is further contemplated that the leg portions 170 could be attached to and extend from the intermediate portion 104. The bottom edge of 170 includes a strap (not shown) with two loose ends. The ends have mating buckles that go around the legs 74 and connect together to hold the front portion 102 of the cover 100 to snowmobile 10.

The rearward portion 106 is rearward of the forward portion 102 and covers the straddle-seat 60. It is contemplated that in some implementations the cover 100 could cover less than all of the straddle-seat 60. It is contemplated that in implementations of the snowmobile 10 including a passenger seat, rearward of the driver's seat 60, the rearward portion 106 could cover the passenger seat as well. It is also contemplated that the rearward portion 106 could extend further rearward. In some implementations, the rear portion 106 could extend rearward to cover and secure around the rear end of the fuel tank 28. In other implementations, the rear portion 106 could extend rearward to the rear end 14 of the snowmobile 10 to cover all of the tunnel 18.

A pair of clips 190 are disposed on opposite sides of the cover 100 to aid in securing the rearward portion 106 of the cover 100 to the snowmobile 10. The clips 190 secure the rearward portion 106 to the footrests 64 on either side of the snowmobile 10. The clips 190 are fixedly connected to the cover 100. It is contemplated that the clips 190 could be sewn, glued or fixedly connected to the cover 100 by other means. It is also contemplated that the clips 190 could be removably connected to the cover 100. For example, the clips 190 could be removably connected to the cover 100 by a zipper, snaps, hook and loop fasteners or buttons. It is contemplated that the clips 190 could be positioned on the cover 100 at positions other than those shown in the Figures. While the clips 190 are provided with the cover 100 in the present implementation, it is contemplated that the cover 100 could be provided without the clips 190 and/or that different means of securing the cover 100 to the snowmobile 10 could be utilized. Further details relating to clips similar to the clips 190 can be found in at least U.S. Pat. No. 8,764,097, published Jul. 1, 2014, entitled "Cover for a Vehicle," the entirety of which is hereby incorporated by reference.

The rearward portion 106 of the cover 100 also includes a pair of bungee cords (not shown) connected to opposite sides of the rearward portion 106 cover 100. When the cover 100 covers the snowmobile 10, the bungee cords are hooked to an underside of the tunnel 18. It is contemplated that the bungee cords could be hooked to a different portion of the tunnel 18 or another portion of the snowmobile 10. It is also contemplated that more or fewer bungee cords could be used. It is further contemplated that instead of or in addition to the bungee cords, one or more straps could be used to secure rearward portion 106 to the snowmobile 10. It is also contemplated that the rearward portion 106 of the cover 100 could have an elastic contouring to secure the cover 100 around, for example, the seat 60 or the fuel tank 28.

The protective cover 100 further includes the intermediate portion 104, which extends from the forward portion 102, over the handlebar 84, and rearward to the rearward portion 106 of the cover 100. The intermediate portion 104 includes two overlapping edges 122, 124. The edges 122, 124 define an aperture 120 for selectively accessing the handlebar 84 when the protective cover 100 is installed on the snowmobile 10. When the aperture 120 is closed, as is illustrated in FIGS. 2 to 5, a top-side edge 122 overlays an underside edge 124.

In the present implementation, the aperture 120 is in the form of a slit 120, where the top-side edge 122 and the underside edge 124 are connected at ends of the slit 120. It is contemplated that the aperture 120 could be differently shaped, depending on the implementation.

Figure 3:
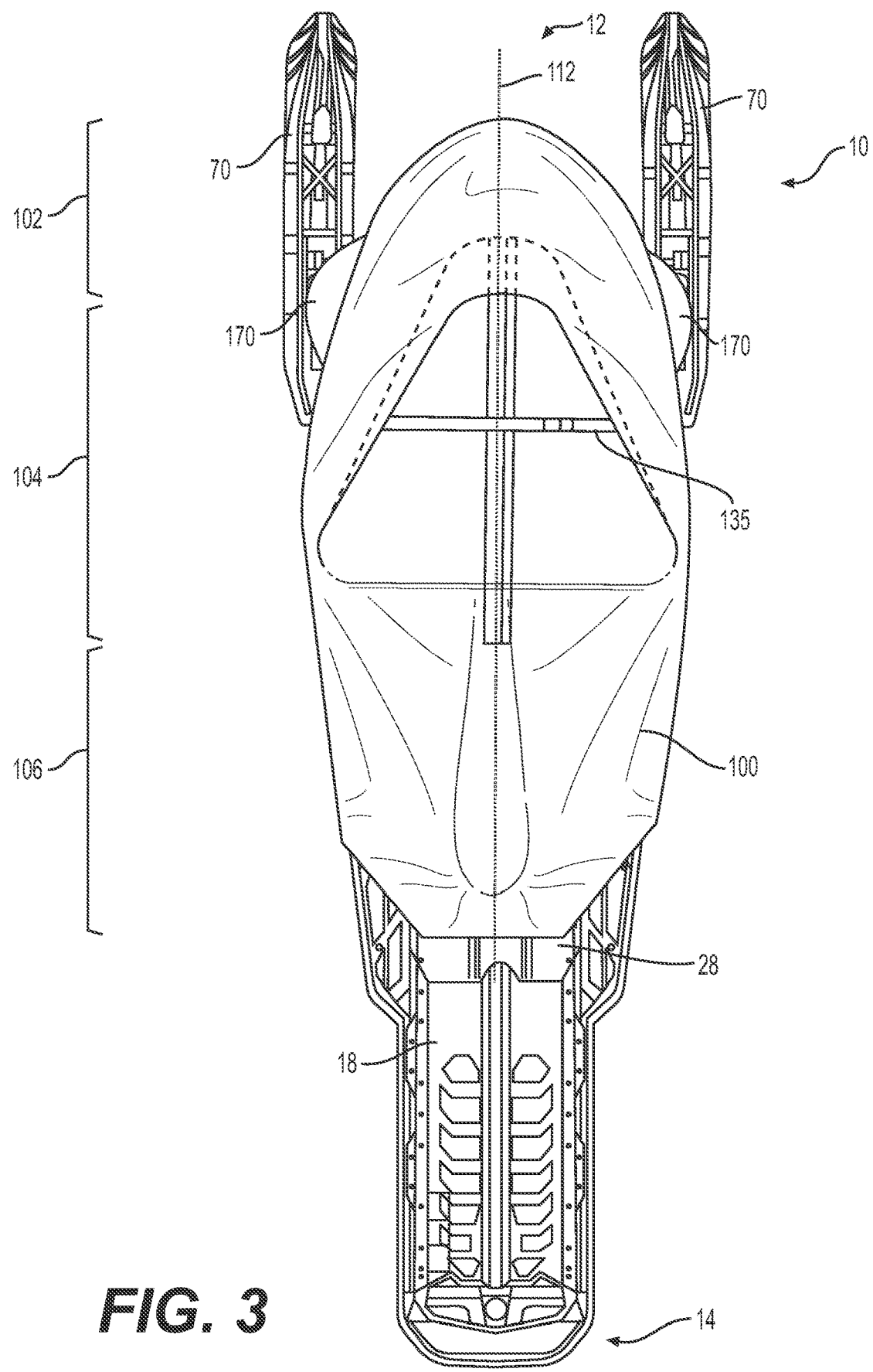
FIG. 3 is a top plan view of the snowmobile and protective cover of FIG. 2.
Figure 4:
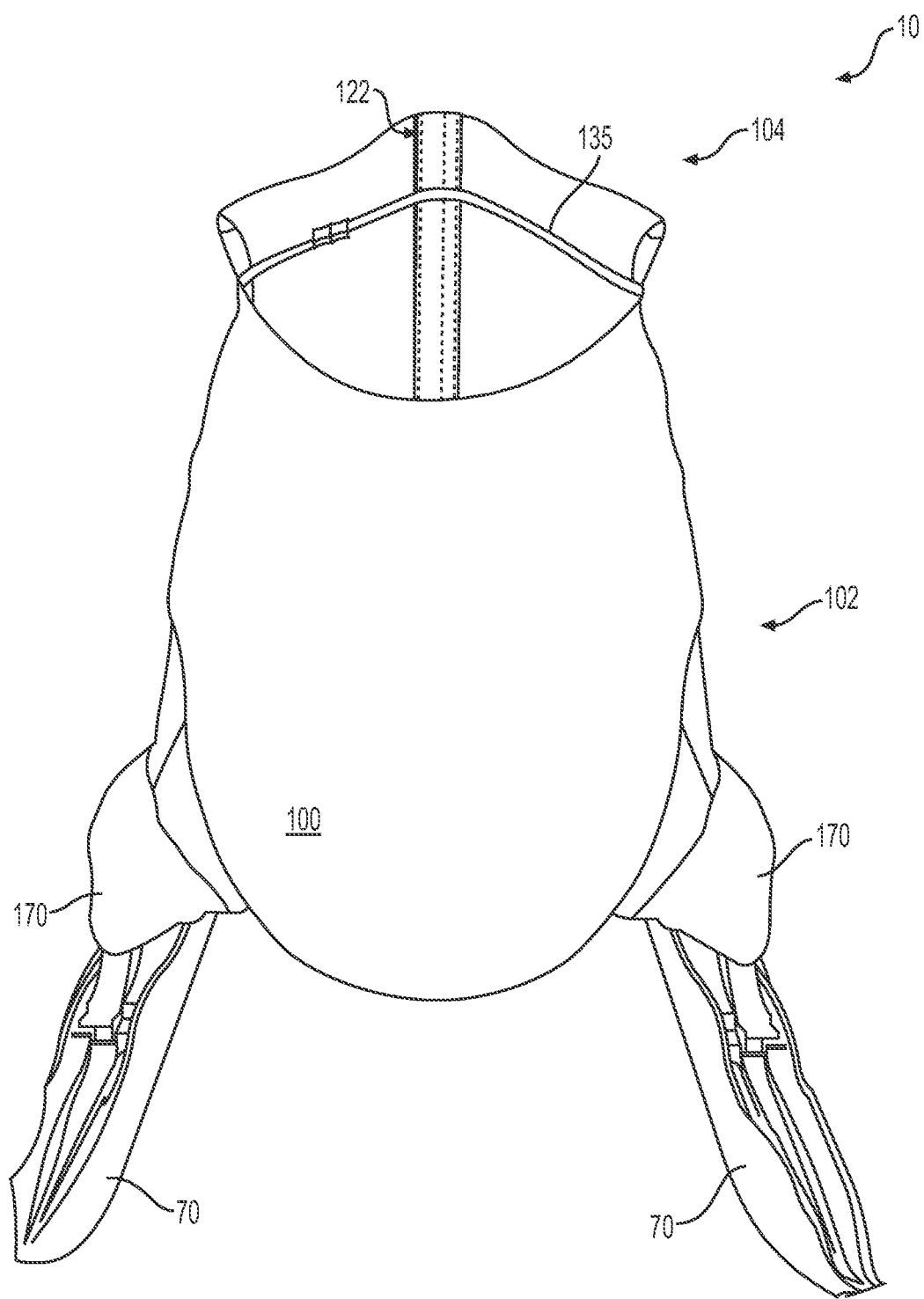
FIG. 4 is a top, front side perspective view of the snowmobile and protective cover of FIG. 2.
Figure 5:
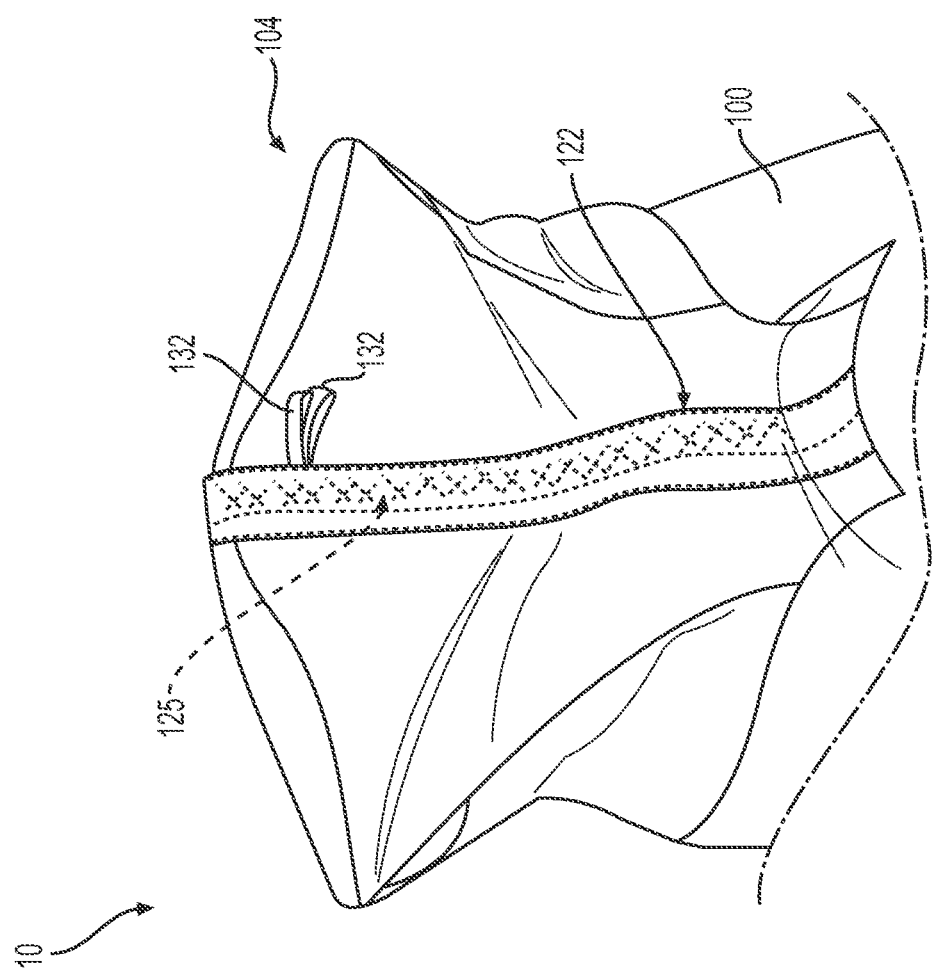
FIG. 5 is a rear, left side partial perspective view of the snowmobile and protective cover of FIG. 2.
Figure 6:
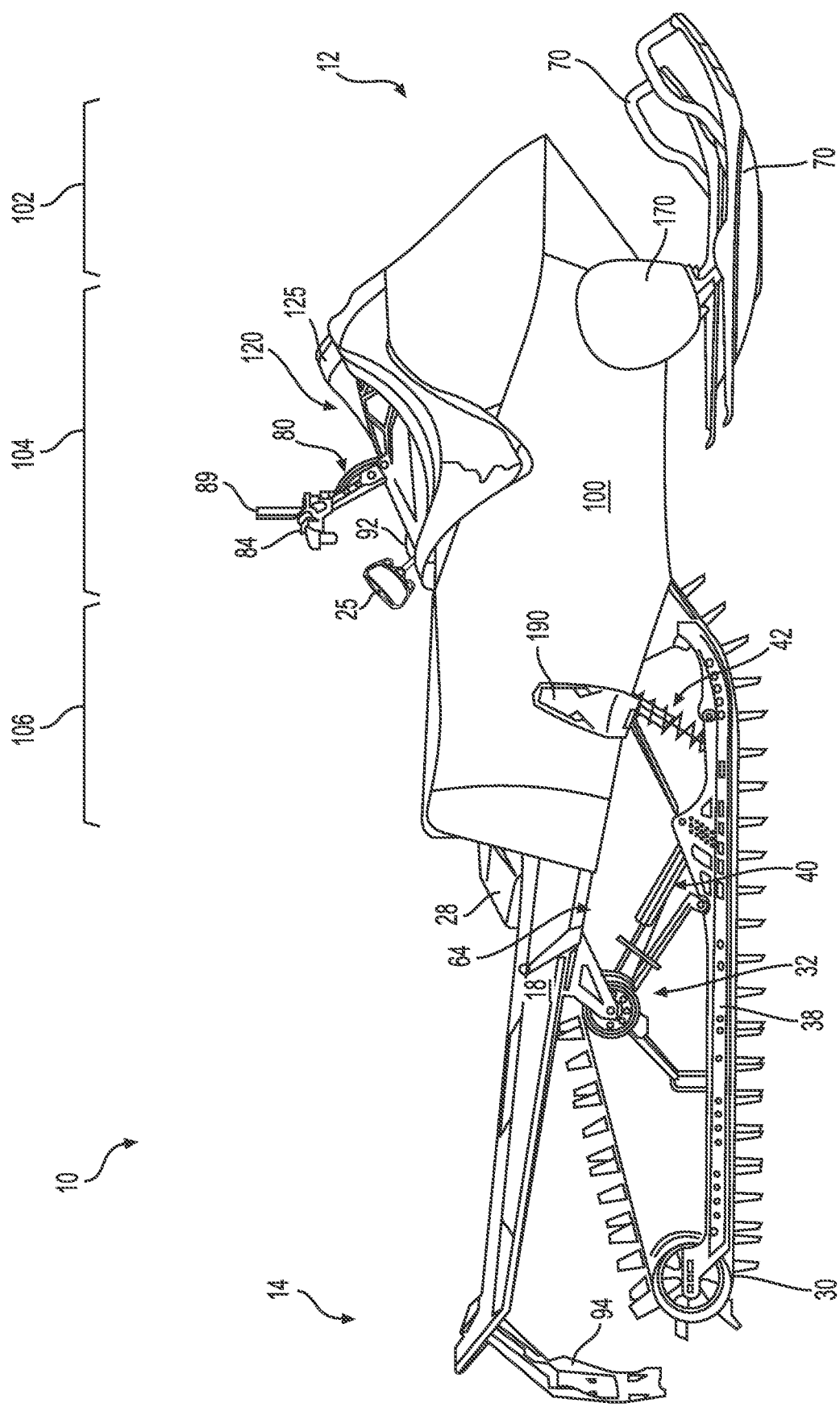
FIG. 6 is the right side elevation view of the snowmobile and protective cover of FIG. 2, with an aperture of the protective cover having been opened.
Figure 7:
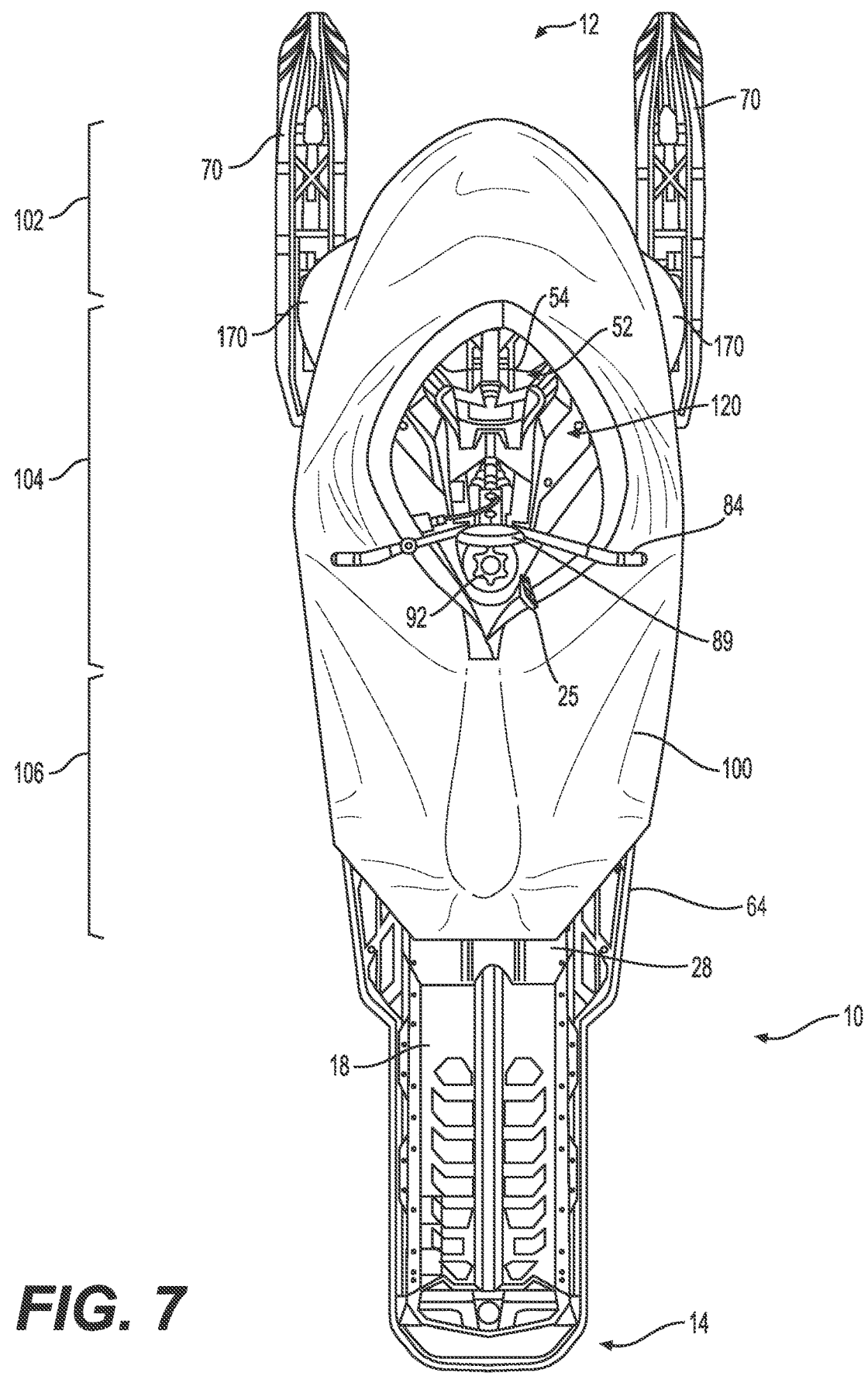
FIG. 7 is a top plan view of the snowmobile and protective cover of FIG. 2, with the aperture having been opened.

The slit 120 extends longitudinally along a centerline 112 of the protective cover 100, as is illustrated in FIG. 3. It is contemplated that the aperture 120, whether in the form of the slit 120 or differently shaped, could be differently oriented with respect to the centerline 112. One such example is described below with reference to FIG. 12. When installed on the snowmobile 10 and the slit 120 is closed, the slit 120 extends from a position rearward and below the handlebar 84, up over a highest point on the snowmobile 10, and then downward and forward of the handlebar 84. In the present implementation, the slit 120 extends over a top of the handlebar 84 and the mountain strap 89. It is contemplated that the snowmobile 10 could include a windshield, which would be the highest point on the snowmobile 10 over which the slit 120 would extend.

The slit 120 extends both forward and rearward of the handlebar 84, in order to provide an opening large enough to be pushed down around the handlebar 84. The slit 120 is also at least as long as the distance from a rear side of the gas filler cap 92 to a rear side of the pivotable cover 54 of the storage compartment 52, in order to access the gas filler cap 92, the storage compartment 52, and the handlebar 84 therebetween, as will be described in more detail below. It is contemplated that the slit 120 could extend farther forward along the snowmobile 10, as is illustrated in FIG. 3 by the dashed lines, so that the front headlights 57 could be used while the cover 100 is installed on the snowmobile 10, as in the implementation described below in reference to FIGS. 13 to 18 below.

The cover 100 includes a fastener 125 for selectively closing, and keeping closed, the aperture 120 when the handlebar 84 and a top side of the vehicle body 16 of the snowmobile 10 are to be protected. In the implementation illustrated in FIGS. 2 to 9, the fastener 125 is a hook and loop system 125, but, as will be described below, different fasteners can be used in different implementations. Each edge 122, 124 includes a pull-tab 132 to aid in pulling the fastener 125 apart to open the aperture 120. It is contemplated that more or fewer pull-tabs 132 could be included in different implementations, and the pulls-tabs 132 could be omitted altogether. It is also contemplated that different means for gripping the edges 122,124 for opening the aperture 120 could be utilized.

It is contemplated that the fastener 125 could be omitted in certain implementations. In such a case, different facets of the protective cover 100 could act to keep the aperture 120 generally closed, including for example, biasing means included in the edges 122, 124, or tension of the protective cover 100 itself when installed tautly on the snowmobile 10.

The intermediate portion 104 also includes a strap and clip assembly 135 connected to opposite sides of the intermediate portion 104. The strap and clip assembly 135 selectively connects over the edges 122, 124 when the aperture 120 is closed. The strap and clip assembly 135 is selectively tightened in order to more snugly fit the cover 100 to the snowmobile 10. It is contemplated that different means could be employed to tightened the intermediate portion 104 of the protective cover 100 around the snowmobile 10. It is also contemplated that the strap and clip assembly 135 could be omitted in some implementations.

Figure 8:
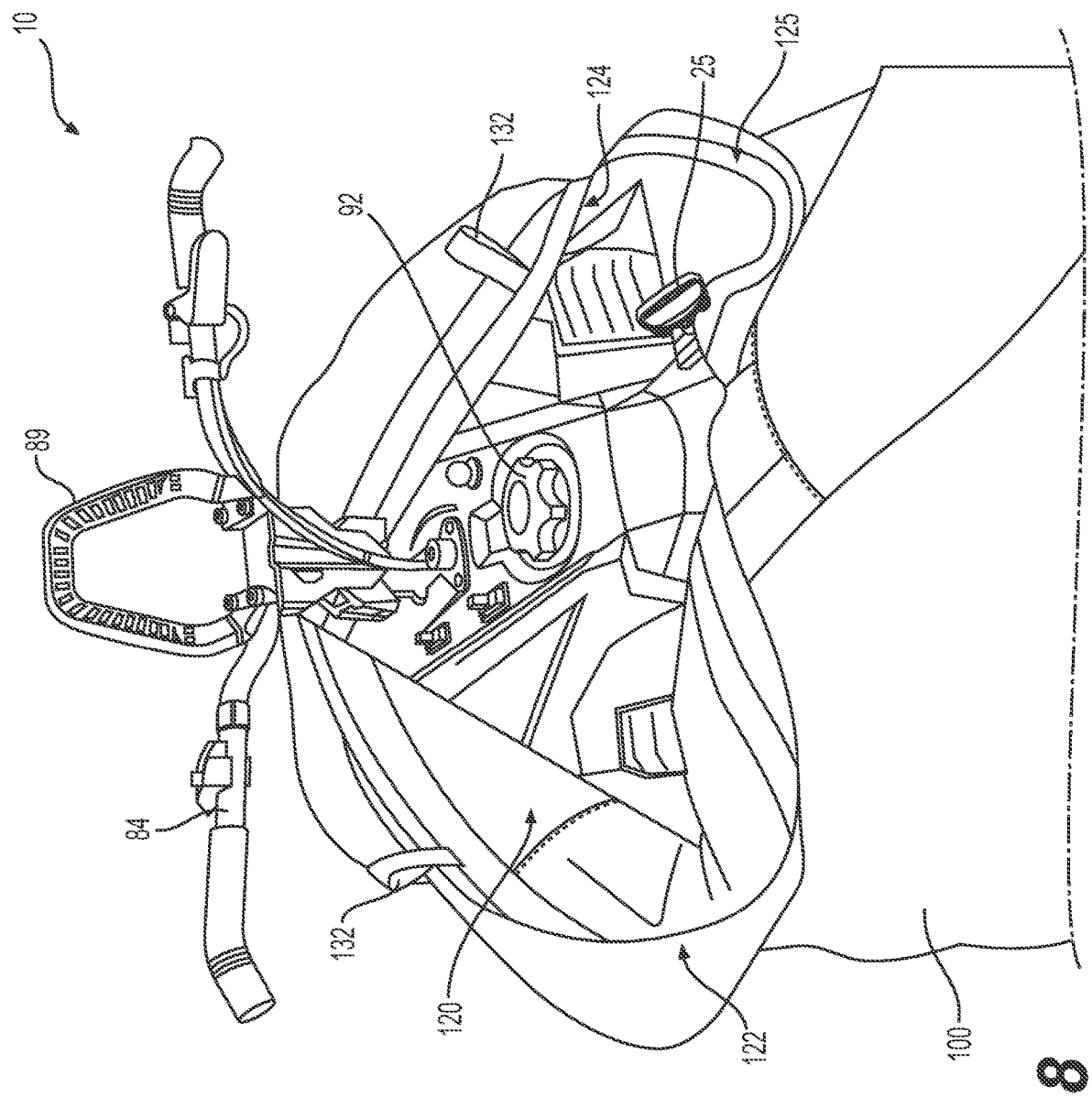
FIG. 8 is the rear, left side partial perspective view of the snowmobile FIG. 2, with the aperture of the cover having been opened.
Figure 9:
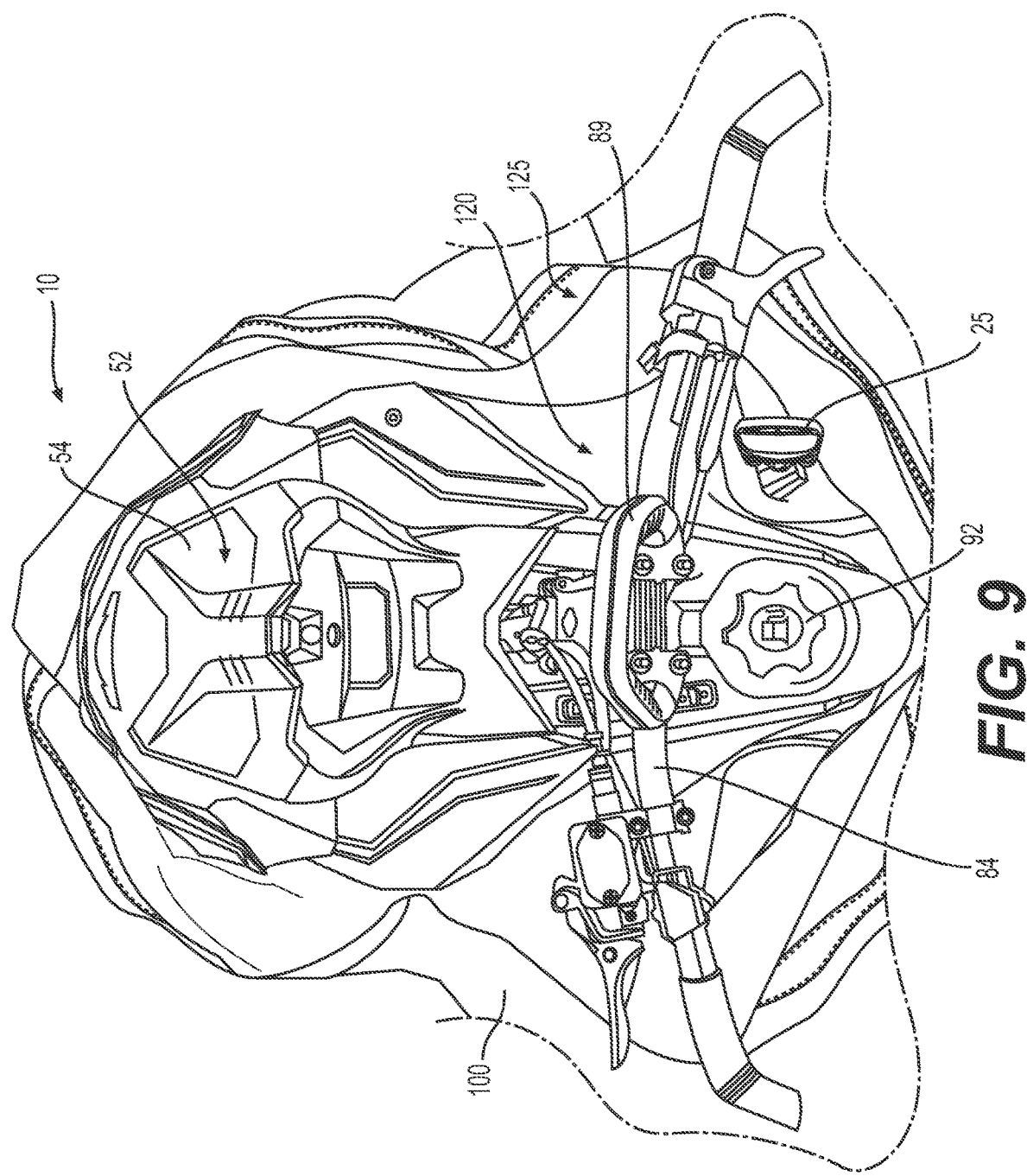
FIG. 9 is a top, rear side partial perspective view of the snowmobile and protective cover of FIG. 2, with the aperture of the cover being open and pushed down around a storage compartment.

As is illustrated in FIGS. 6 to 9, the aperture 120 is sized, shaped, and located such that the intermediate portion 104, when the aperture 120 is opened, can be pushed down around the handlebar 84 such that the handlebar 84 extends through and above the protective cover 100. As can be seen in FIG. 8, the handle 25 for the rewind starter and the gas filler cap 92 are also accessible when the intermediate portion 104 is pushed down around the handlebar 84. In FIG. 9, it can be seen that the aperture 120 reveals the storage compartment cover 54 in order to access the forward storage compartment 52. It is contemplated that the aperture 120 may be smaller than in the present implementation, and the handle 25, the gas cap 92, and the storage compartment 52 may not be simultaneously accessible.

With the handlebar 84 extending above the protective cover 100 and the handle 25 for the rewind starter being accessible, the handlebar 84 and the handle 25 are usable (accessible to the driver) via the aperture 120. As such, the snowmobile 10 is capable of being operated, at least for limited operations, without needing to remove the protective cover 100. Due to the selective access to the handlebar 84 and the handle 25 for the rewind starter provided by the aperture 120, and because the skis 70 are also not impeded by the protective cover 100, the protective cover 100 can be installed on the snowmobile 10 at a convenient location; the snowmobile 10 can then be moved a short distance to its desired location, using the snowmobile's 10 own propulsion. For example, if the snowmobile 10 is to be stored in a small space where it would not be convenient or possible to install the cover 100 once the snowmobile 10 is in its storage space, the protective cover 100 could be installed just outside the storage space, and then driven into the space. Once parked at its desired location, the driver would simply close the aperture 120 using the fastener 125 to finish covering the snowmobile 10 with the protective cover 100. Similarly, the aperture 120 gives selective access to the storage compartment 52. If the driver (or passenger) simply wants to retrieve an item from the compartment 52, the aperture 120 can simply be opened to reveal the compartment cover 54, and the driver or passenger can retrieve their item from the compartment 52 without being required to remove the entire protective cover 100.

Figure 10:
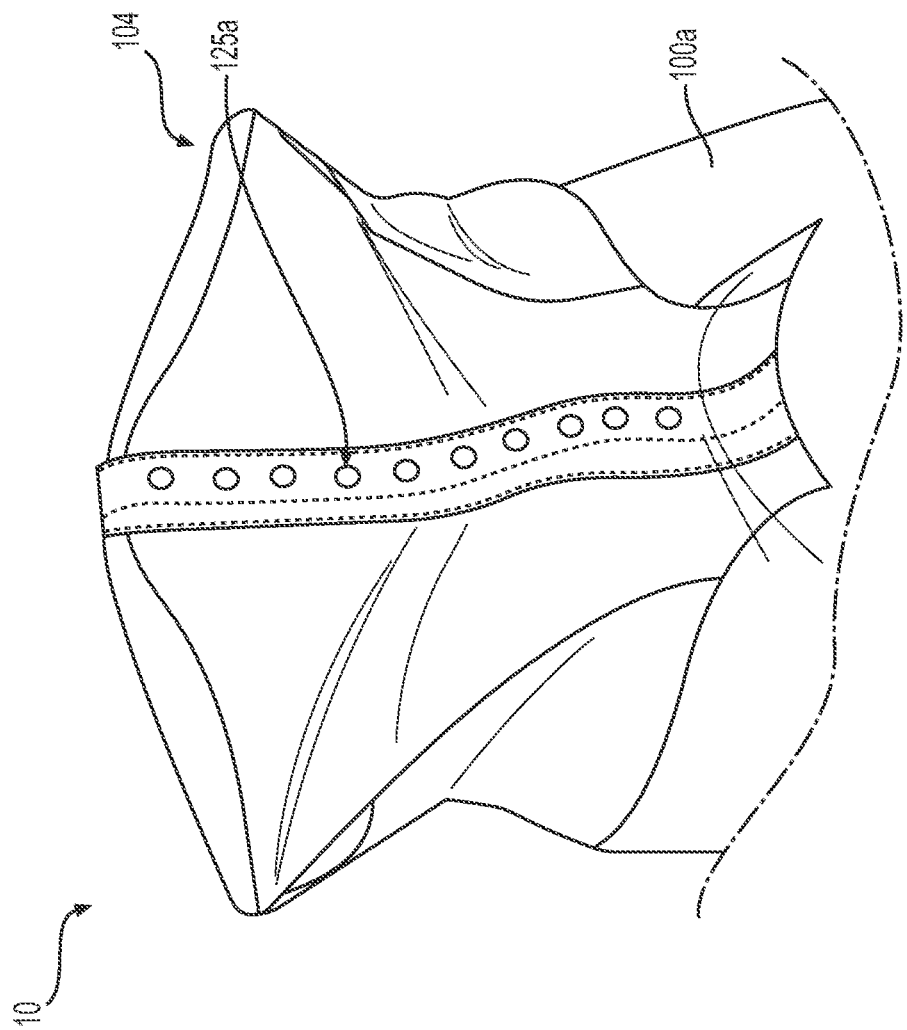
FIG. 10 is a top, rear side partial perspective view of the snowmobile of FIG. 1 with another implementation of a protective cover installed thereon.
Figure 11:
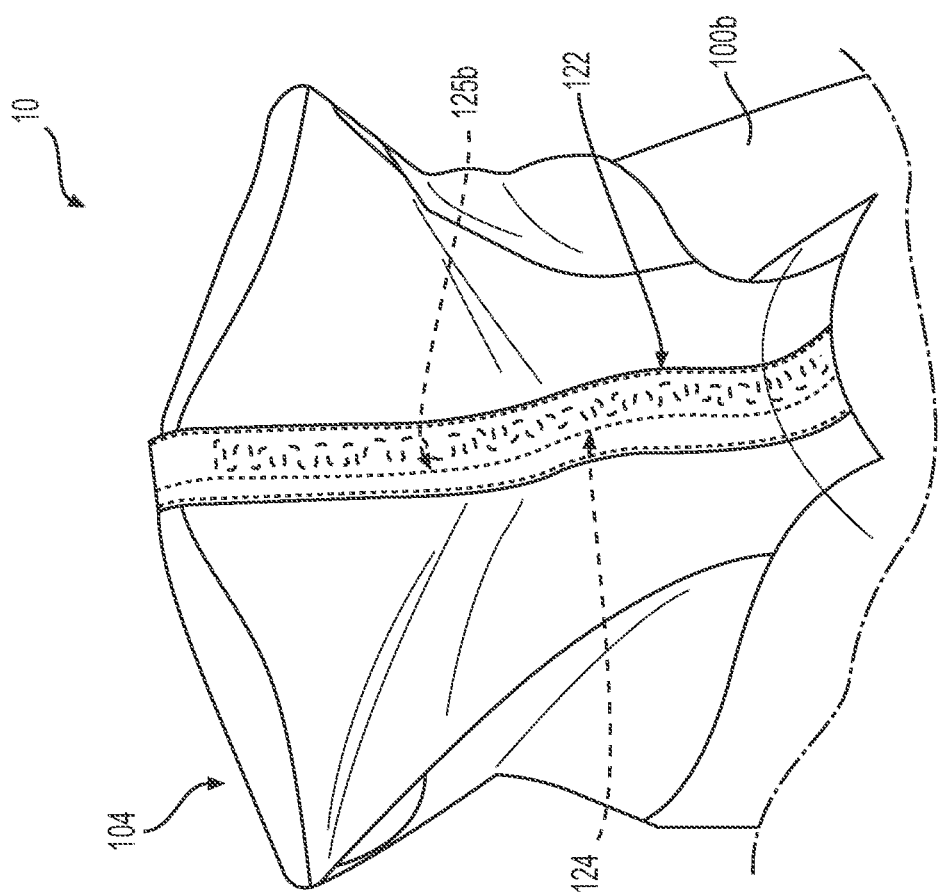
FIG. 11 is a top, rear side partial perspective view of the snowmobile of FIG. 1 with yet another implementation of a protective cover installed thereon.

Different implementations of protective covers 100a, 100b according to the present technology are illustrated in FIGS. 10 and 11. The protective covers 100a, 100b of FIGS. 10 and 11 differ from the protective cover 100 in at least their fasteners; elements of the covers 100a, 100b that are similar to those of the protective cover 100 retain the same reference numeral.

FIG. 10 illustrates a protective cover 100a which includes a series of snaps 125a as the fastener 125a. To selectively open the aperture 120, the two edges 122,124 are pulled in opposite directions until the snaps 125a release. FIG. 11 illustrates a protective cover 100b which includes a zipper 125b as the fastener 125b. Opposite sides of the zipper 125b are sewn to surfaces of the edges 122, 124 such that the zipper 125b is disposed in the overlapping space between the two overlapping edges 122, 124.

Figure 12:
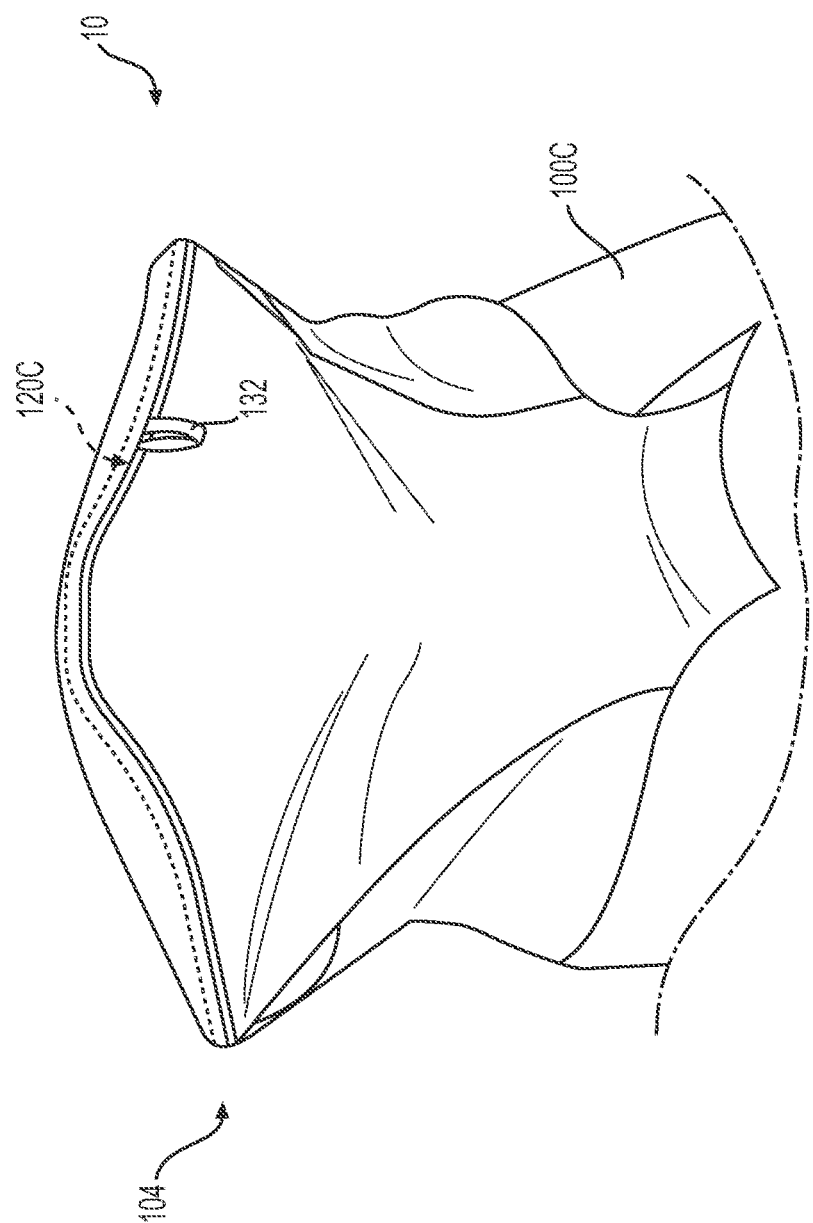
FIG. 12 is a top, rear side partial perspective view of the snowmobile of FIG. 1 with yet another implementation of a protective cover installed thereon.
Figure 13:
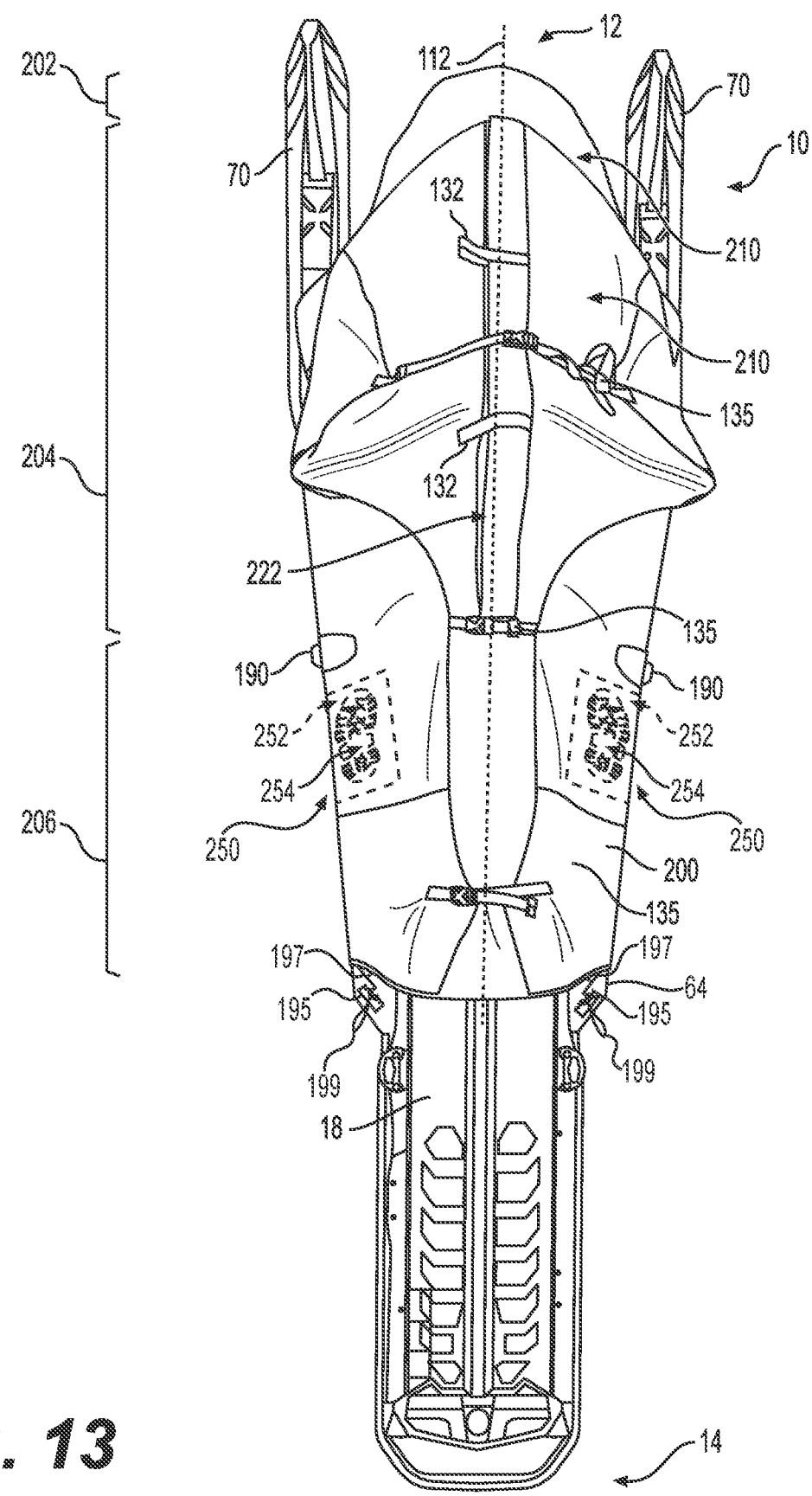
FIG. 13 is a top plan view of the snowmobile of FIG. 1 with another implementation of a protective cover installed thereon.
Figure 14:
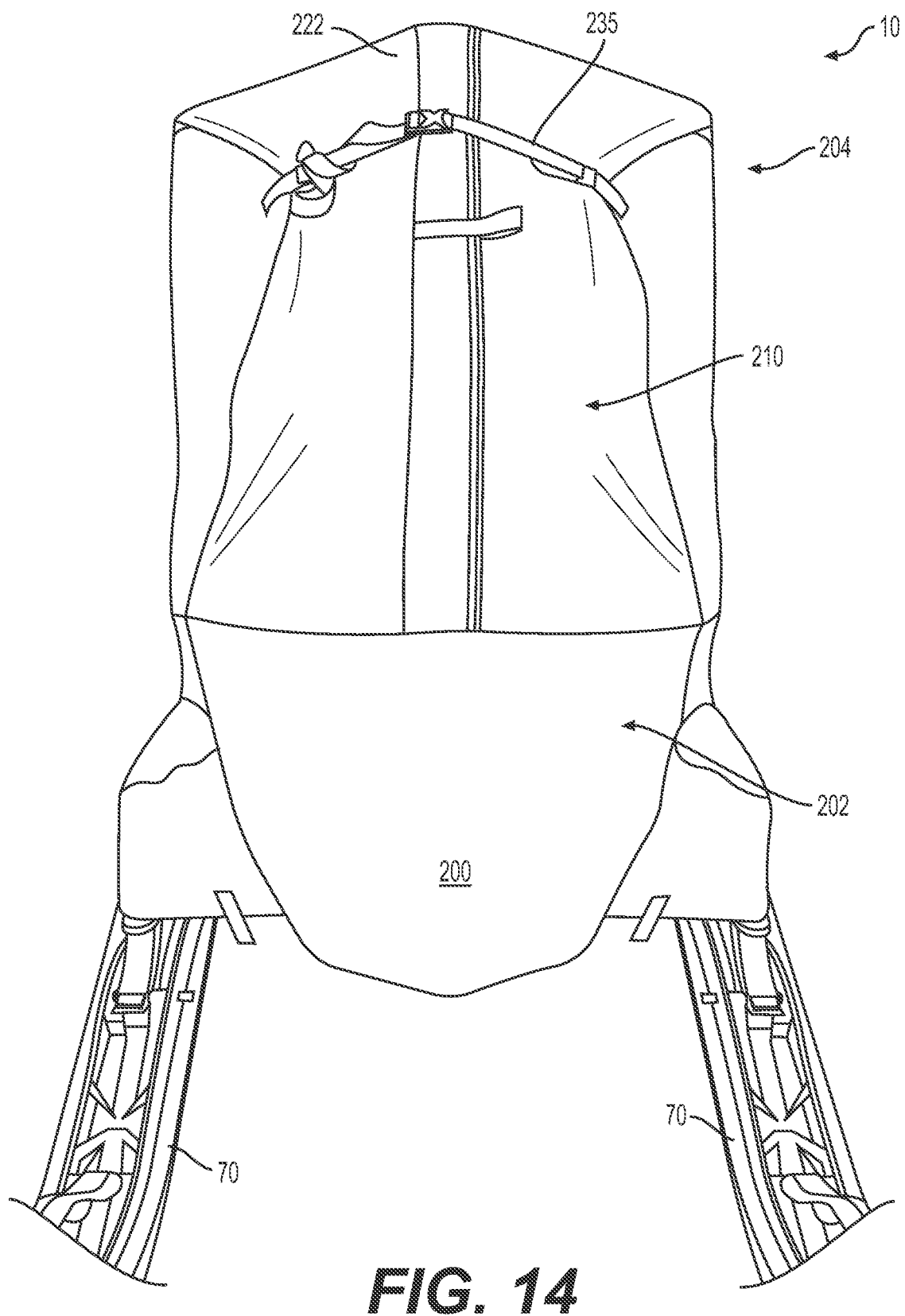
FIG. 14 is a top, front side perspective view of the snowmobile and protective cover of FIG. 13.
Figure 15:
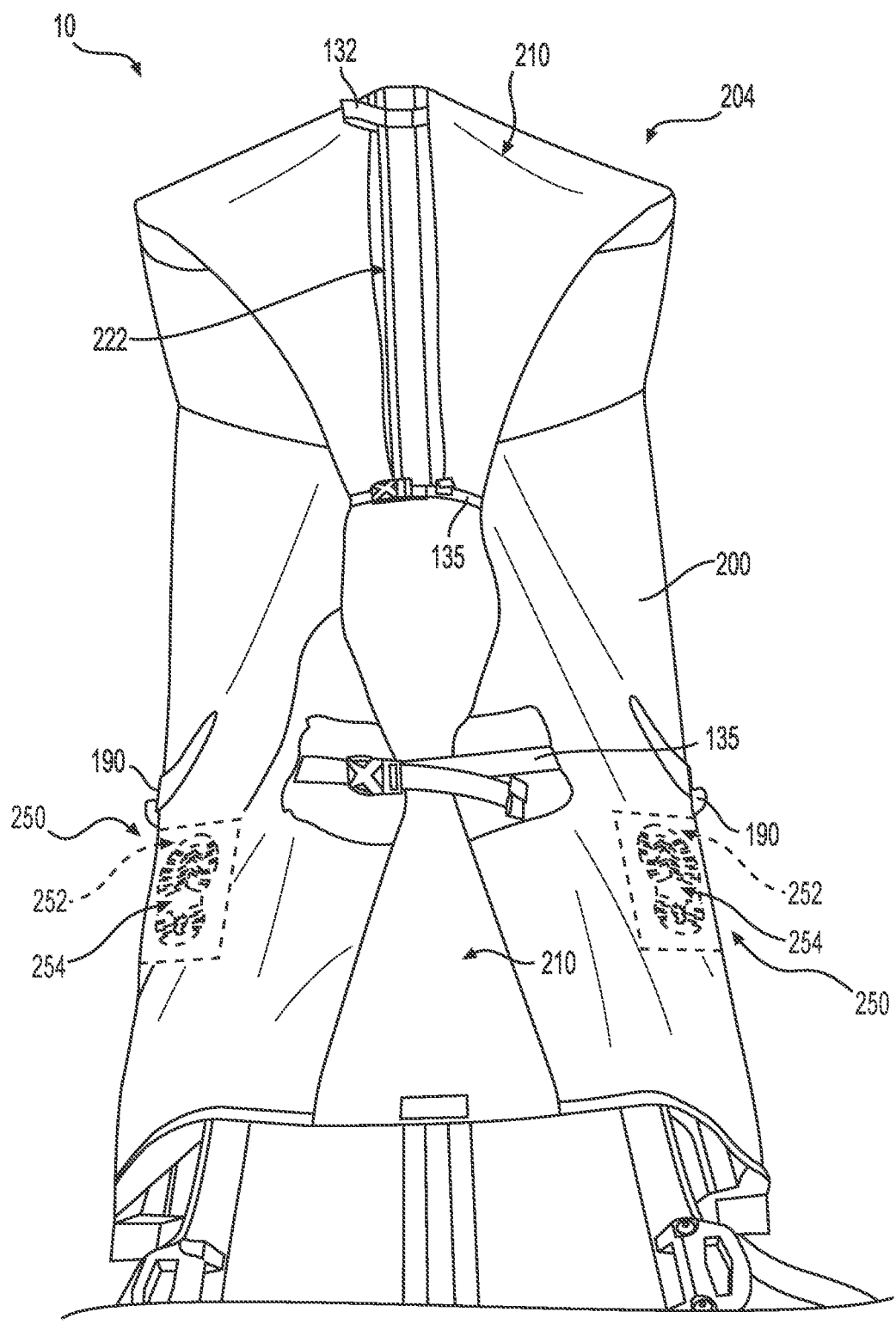
FIG. 15 is a top, rear side perspective view of the snowmobile and protective cover of FIG. 13.

Yet another implementation of a protective cover 100c according to the present technology is illustrated in FIG. 12. Elements of the protective cover 100c that are similar to those of the protective cover 100 retain the same reference numeral. The cover 100c includes an aperture 120c which is a slit 120c extending laterally across the intermediate portion 104 (orthogonal to the centerline 112). The aperture 120c is as wide as a width of the handlebar 84 of the snowmobile 10, such that the aperture 120c can be pulled down around the handlebar 84 and the handle 25 for the rewind starter, as described above. It is contemplated that the shape and the width of the aperture 120c could vary, depending on the implementations. Although not specifically illustrated, the protective cover 100c could have the fasteners 125, 125a, 125b of the covers 100, 100a, 100b, or other fastening means.

With reference to FIGS. 13 to 19, another implementation of a protective cover 200 for the snowmobile 10 will be described. Portions of the cover 200 which are substantially similar to the cover 100 described above retain the same reference numerals and will not be described again here.

The cover 200 is partially made from a water resistant polyester material, like the one used for the cover 100. The cover 200 also includes panels 210 made from a water resistant and stretchable material. The stretchable panels 210 allow the cover 200 to fit the form of the vehicle body 16, as well as to accommodate different implementations of snowmobile vehicle bodies. The stretchable panels 210 extend along the centerline 112 of the cover 200 and are generally symmetric about the centerline 112. It is contemplated that the stretchable panels 210 could be of different forms than that illustrated. For example, in some implementations the stretchable panels 210 could be asymmetric about the centerline 112.

The cover 200 can be generally described as having three portions: a forward portion 202, an intermediate portion 204, and a rearward portion 206. It is contemplated that the portions 202, 204, 206 could be three cover sections that are sewn together. It is also contemplated that the cover 200 could be formed from more or less than three sections joined together. The forward, intermediate, and rearward portions 202, 204, 206 together cover a majority of the vehicle body 16, although the protective cover 200 could cover more or less of the vehicle body 16 and the snowmobile 10, as will be described further below.

The forward portion 202 wraps around the front end 12 of the snowmobile 10 and covers at least a forward portion of the front cowls 66. It is contemplated that the forward portion 202 could cover less of the vehicle body 16 in different implementations.

The forward portion 202 wraps around the front end 12 and extends partially downward from the front end 12 to partially cover the two front suspension assemblies 72. More or less of the front suspension assemblies 72 could be covered than illustrated, although the front skis 70 will remain uncovered. It is contemplated that the cover 200 may not cover the front suspension assemblies 72 in some implementations.

The rearward portion 206 is rearward of the forward portion 202 and covers the straddle-seat 60 and the rear end of the fuel tank 28. It is contemplated that in some implementations the cover 200 could cover more or less than of the vehicle 10. It is contemplated that in implementations of the snowmobile 10 including a passenger seat, rearward of the driver's seat 60, the rearward portion 206 could cover the passenger seat as well.

The rearward portion 206 further includes two foot-receiving portions 250, illustrated in FIGS. 13 and 15-17. The two foot-receiving portions 250 are located on opposite sides of the centerline 112 of the cover 200. It is contemplated that the foot-receiving portions 250 could be included in the intermediate portion 204, depending on the specific implementation. The protective cover 100, described above, may also include foot-receiving portions 250 in some implementations.

Each foot-receiving portion 250 includes a layer of material 252 (shown schematically, see also FIG. 19), connected to an underside of the rearward portion 206. The layer of material 252 reinforces the protective cover 200 at the foot-receiving portions 250, to aid in preventing damage to the cover 200 from the metal of the tunnel 18, the footrest 86, and/or the rider's boot. The layer of material 252 wraps around an exterior edge of the footrest 86 as well. As such, the cover 200 is partially protected from ripping or becoming pinched between the rider's feet, the exterior edge, and/or the sharp edges on the footrest 86, which are normally present to prevent the rider's feet from slipping when the cover 200 is not present.

Figure 19:
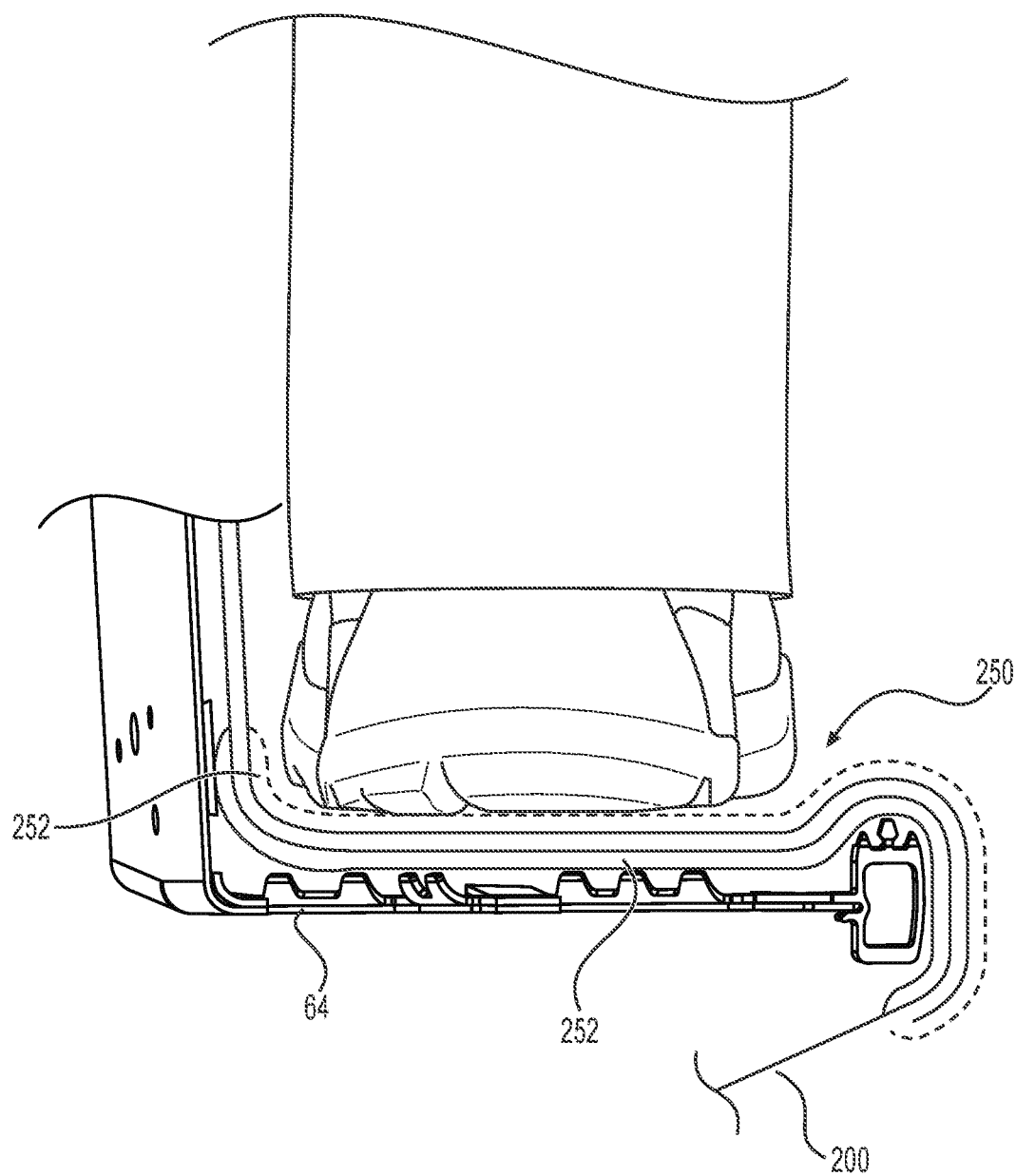
FIG. 19 is a rear, cross-sectional view of the protective cover and a footrest of the snowmobile of FIG. 13, with a foot of the driver placed on a foot-receiving portion of the protective cover.

In some implementations, it is contemplated that the layer of material 252 could be connected to a top surface of the rearward portion 206, as is illustrated in dashed lines in FIG. 19. In such an implementation, it is also contemplated that the layer of material 252 could have anti-slip properties to aid in maintaining the driver's foot on the foot-receiving portion 250. It is further contemplated that the layer of material 252 could be connected to both the top surface and the underside of the rearward portion 206. It is further contemplated that, in some implementations, the part of the rearward portion 206 at the foot-receiving portion 250 could be removed. The layer of material 252 could then be sewn to the surrounding rearward portion 206, such that the material 252 is the only layer of material at the foot-receiving portion 250.

In the present implementation, the layer of material 252 is a layer of polyvinyl chloride (PVC) coated fabric 252 sewn to the material of remaining portions of the rear portion 206. It is contemplated that the layer of material 252 could be glued or otherwise attached to the cover 200. It is contemplated that other materials or fabrics could be connected or applied to the protective cover 200 to reinforce the foot-receiving portions 250, for example the layer 252 could be a plastic sheet connected to the cover 200. It is also contemplated that more than one layer of the material 252 could be applied to the protective cover 200. It is further contemplated that more than one different material could be used to reinforce the foot-receiving portions 250.

When the protective cover 200 is installed on the snowmobile 10, each of the foot-receiving portions 250 is disposed over a corresponding footrest 64. This is illustrated in FIG. 19, where one foot of the driver has been placed on the foot-receiving portion 250. By placing the foot on the foot-receiving portion 250, the driver has also placed their foot on the footrest 64 located below the foot-receiving portion 250. The reinforcing material 252 is disposed between the driver's foot and the footrest 64.

The foot-receiving portions 250 each provide a visual indication 254 on a top surface thereof. The visual indication 254 indicates the location of the corresponding foot-receiving portion 250 to the driver. Each visual indication 254 illustrated in the Figures is in the form of a shoe print, but this is a non-limiting example and the specific illustration may vary depending on the implementation. In some implementations, the visual indication 254 could also have anti-slip properties for aiding in maintaining the driver's foot on the foot-receiving portion 250.

A pair of clips 190 are disposed on opposite sides of the cover 200 to aid in securing the rearward portion 206 of the cover 200 to the snowmobile 10, similarly to the cover 100. It is contemplated that the clips 190 could be removably connected to the cover 200. While the clips 190 are provided with the cover 200 in the present implementation, it is contemplated that the cover 200 could be provided without the clips 190 and/or that different means of securing the cover 200 to the snowmobile 10 could be utilized.

The rearward portion 206 further includes a hook 195 for securing the rearward portion 206 to the footrest 64. The hook 195 is connected to a strap 197 which extends rearward from the rearward portion 206. A portion of the strap 197 is made from rubber such that the strap 197 can be stretched to allow placement of the hook 195 on the footrest 64. A loop 199 extends from the hook 195 for aiding the driver in securing the hook 195 to the footrest 64. It is contemplated that the strap 197 could be made from different materials, which may or may not be stretchable. In some non-limiting embodiments, the cover 200 may not include the hook 195 and strap 197. In some other non-limiting embodiments, the cover 200 could include more than one hook 195 and strap 197.

The protective cover 200 further includes the intermediate portion 204, which extends from the forward portion 202, over the handlebar 84, and rearward to the rearward portion 206 of the cover 200. The intermediate portion 204 includes two overlapping edges 222, 224. The edges 222, 224 define an aperture 220 for selectively accessing the handlebar 84 when the protective cover 200 is installed on the snowmobile 10. When the aperture 220 is closed, the top-side edge 222 overlays the underside edge 224. In the present implementation, the aperture 220 is in the form of a slit 220, where the top-side edge 222 and the underside edge 224 are connected at ends of the slit 220. It is contemplated that the aperture 220 could be differently shaped, depending on the implementation.

The slit 220 extends longitudinally along the centerline 112 of the protective cover 200, as with the cover 100. In the present implementation, the slit 220 extends from forward of the headlights 57 and over the top of the handlebar 84 and the mountain strap 89. It is contemplated that the snowmobile 10 could include a windshield, which would be the highest point on the snowmobile 10 over which the slit 220 would extend. It is contemplated that the stretchable panels 210 could accommodate different implementations of the vehicle 10, including in some cases snowmobile windshields.

The slit 220 extends both forward and rearward of the handlebar 84, in order to provide an opening large enough to be pushed down around the handlebar 84 and below the front headlights 57, such that both the handlebar 84 and the headlights 57 are usable with the cover 200 installed on the vehicle 10. In some implementations, the headlights 57 may be partially obscured.

The cover 200 includes the hook and loop system 125 for selectively closing, and keeping closed, the aperture 220 when the handlebar 84 and a top side of the vehicle body 16 of the snowmobile 10 are to be protected. It is contemplated that the cover 200 could include any of the fasteners 125 described above in reference to cover 100, depending on the implementations. It is also contemplated that the fastener 125 could be omitted in certain implementations of the cover 200.

Each edge 222, 224 includes two pull-tabs 132 to aid in pulling the fastener 125 apart to open the aperture 220. It is contemplated that more or fewer pull-tabs 132 could be included in different implementations, and the pulls-tabs 132 could be omitted altogether. It is also contemplated that different means for gripping the edges 222, 224 for opening the aperture 220 could be utilized. The cover 200 also includes three strap and clip assembly 135 connected to opposite sides of the intermediate and rear portions 204, 206. Opposite ends of the assemblies 135 are connected along opposite edges of the stretchable panels 210, as can be seen in at least FIG. 13. The strap and clip assemblies 135 are selectively tightened in order to more snugly fit the cover 200 to the snowmobile 10. One strap and clip assembly 135 tightens the cover 200 to the vehicle 10 forward of the handlebar 84, but upward and rearward of the headlights 57. The second strap and clip assembly 135 disposed over the seat 60. The third strap and clip assembly 135 tightens the cover 200 around a rear side of the seat 60. It is contemplated that different means could be employed to tightened the intermediate portion 204 of the protective cover 200 around the snowmobile 10. It is also contemplated that the strap and clip assemblies 135 could be omitted in some implementations.

Figure 16:
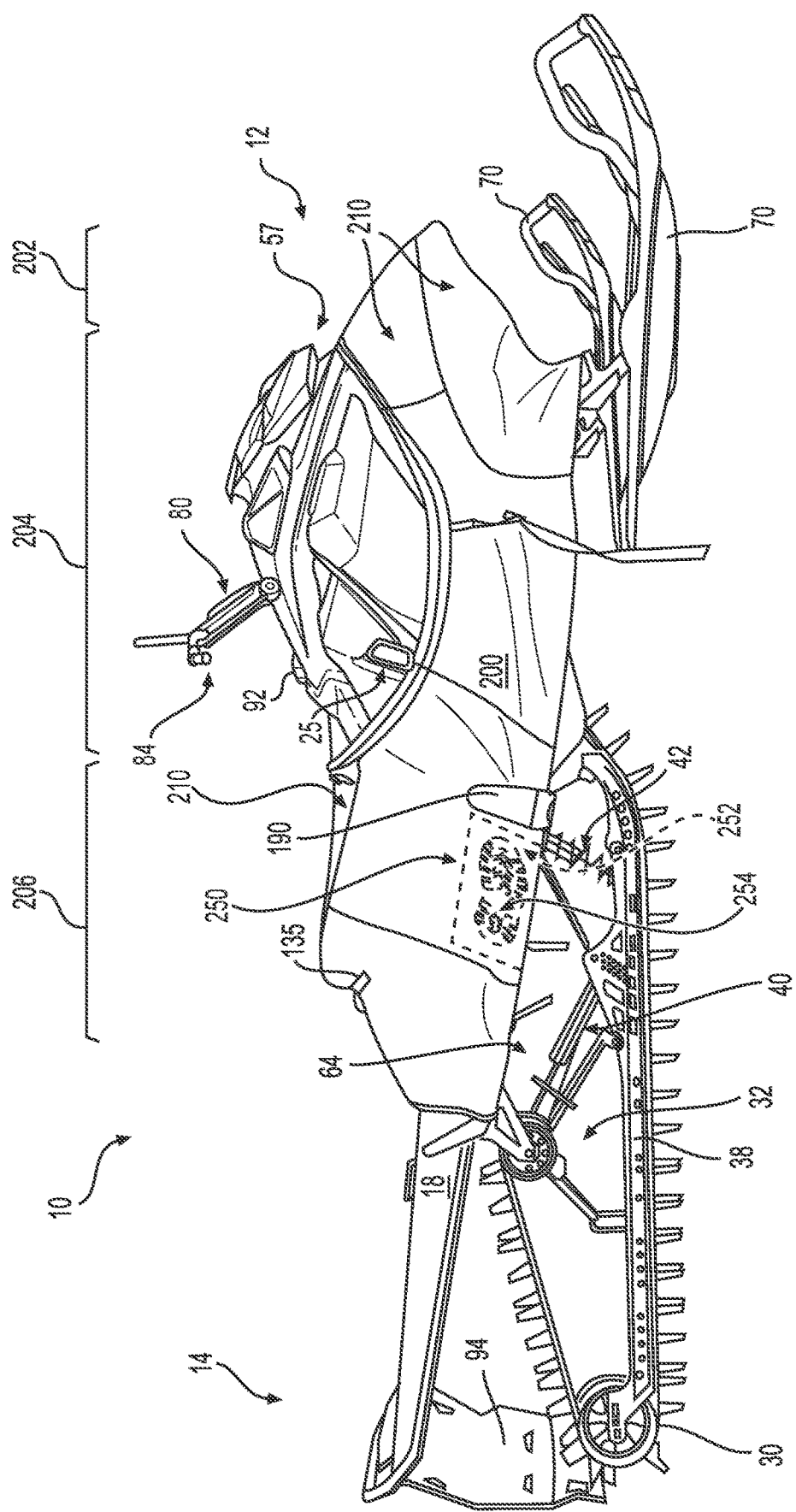
FIG. 16 is a right side elevation view of the snowmobile and protective cover of FIG. 13, with an aperture of the protective cover having been opened.
Figure 17:
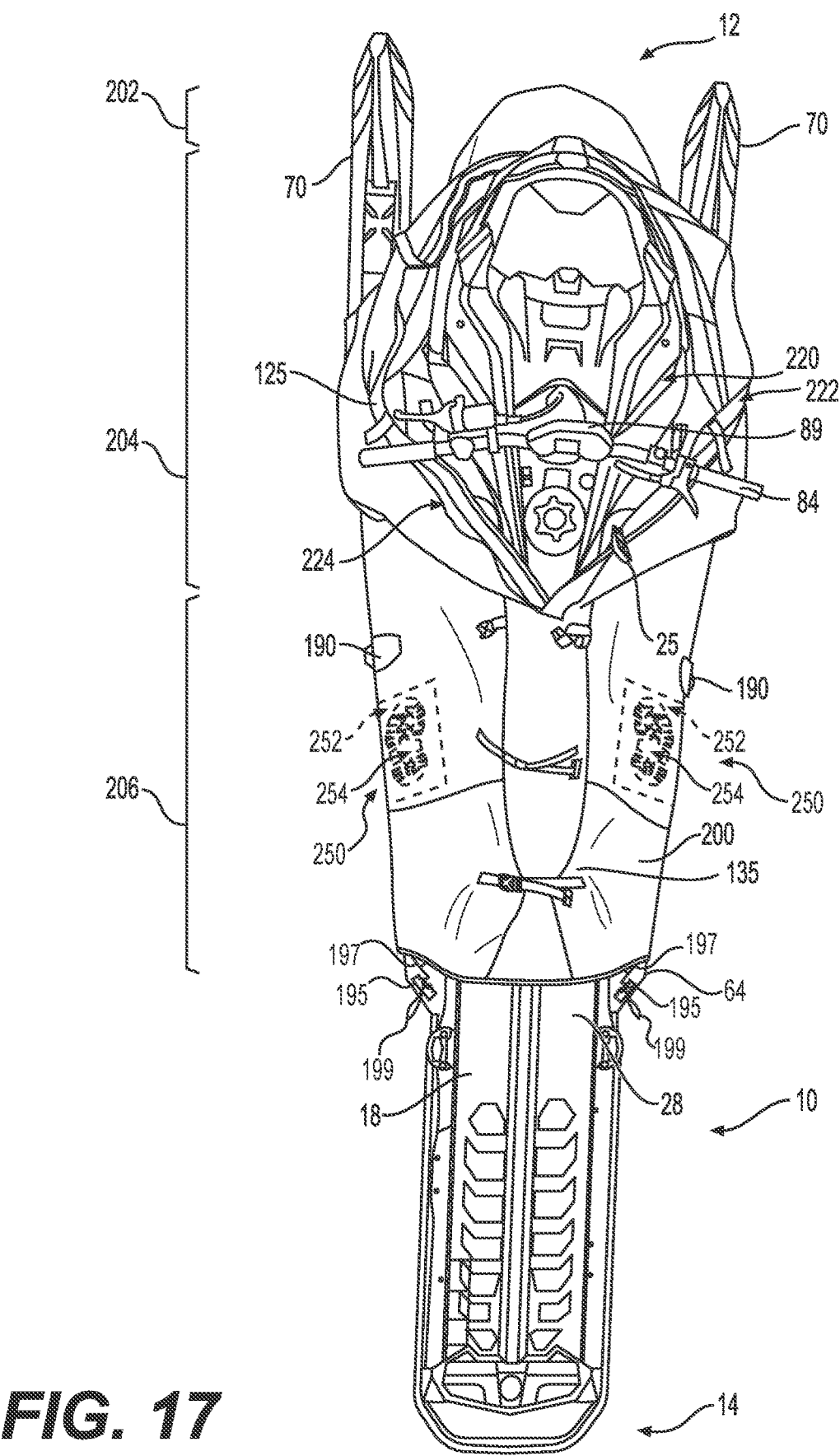
FIG. 17 is the top plan view of the snowmobile and protective cover of FIG. 13, with the aperture of the protective cover having been opened.
Figure 18:
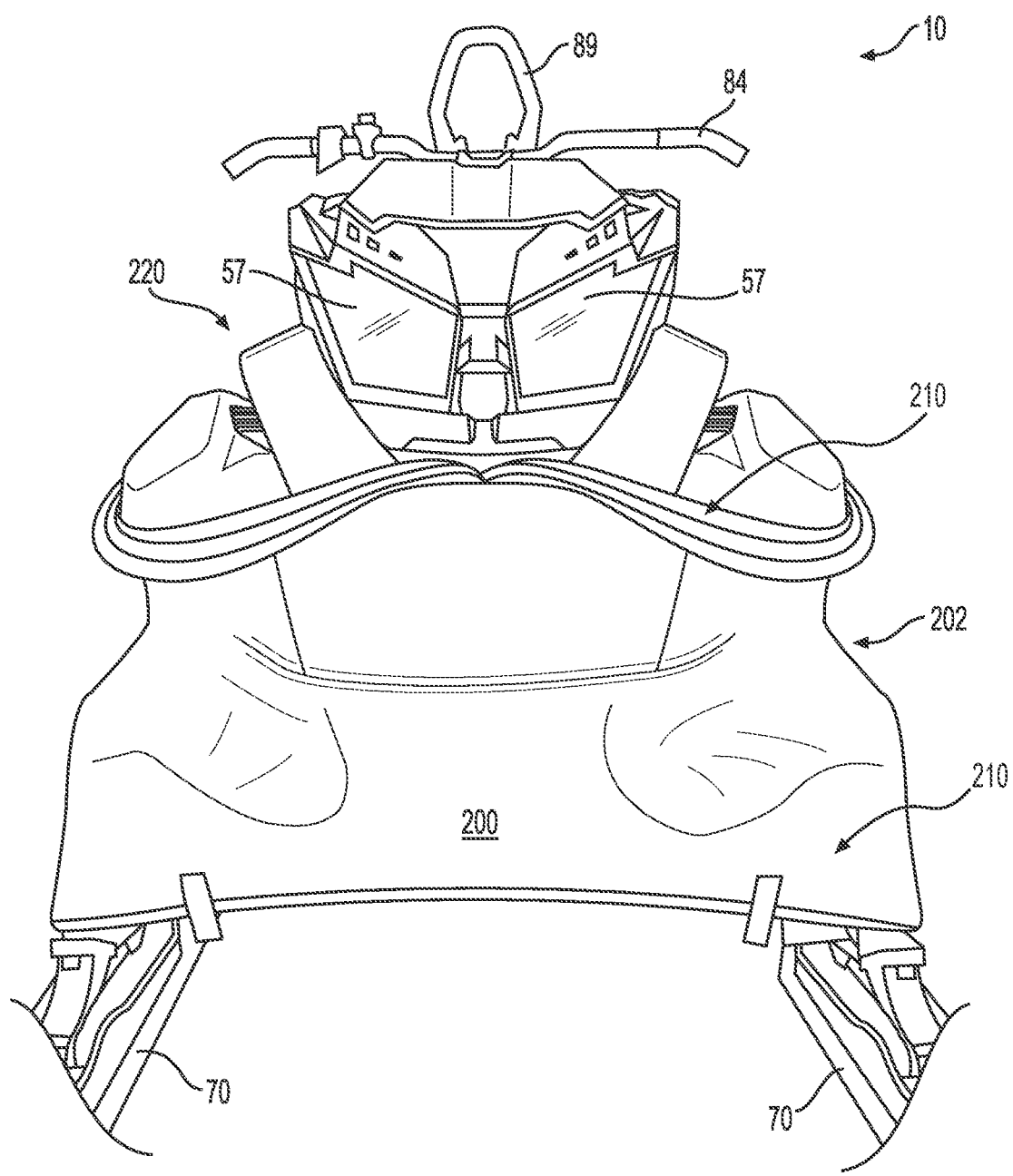
FIG. 18 is the top, front side perspective view of the snowmobile and protective cover of FIG. 13, with the aperture of the protective cover having been opened.

As is illustrated in FIGS. 16 to 18, the aperture 220 is sized, shaped, and located such that the intermediate portion 204, when the aperture 220 is opened, can be pushed down around the handlebar 84 and the front headlights 57 such that the handlebar 84 and the front headlights 57 extend through and above the protective cover 200.

With the handlebar 84 and the front headlights 57 extending above the protective cover 100, the snowmobile 10 is capable of being operated, at least for limited operations, without needing to remove the protective cover 200. Due to the selective access to the handlebar 84 and the front headlights 57 provided by the aperture 220, and because the skis 70 are also not impeded by the protective cover 200, the protective cover 200 can be installed on the snowmobile 10 at a convenient location, similarly to the cover 100. The foot-receiving portions 250 further indicate to the driver where the driver's feet should be placed when driving the snowmobile 10 with the cover 200 installed thereon. The snowmobile 10 can then be moved a short distance to its desired location, using the snowmobile's 10 own propulsion.

Figure 20:
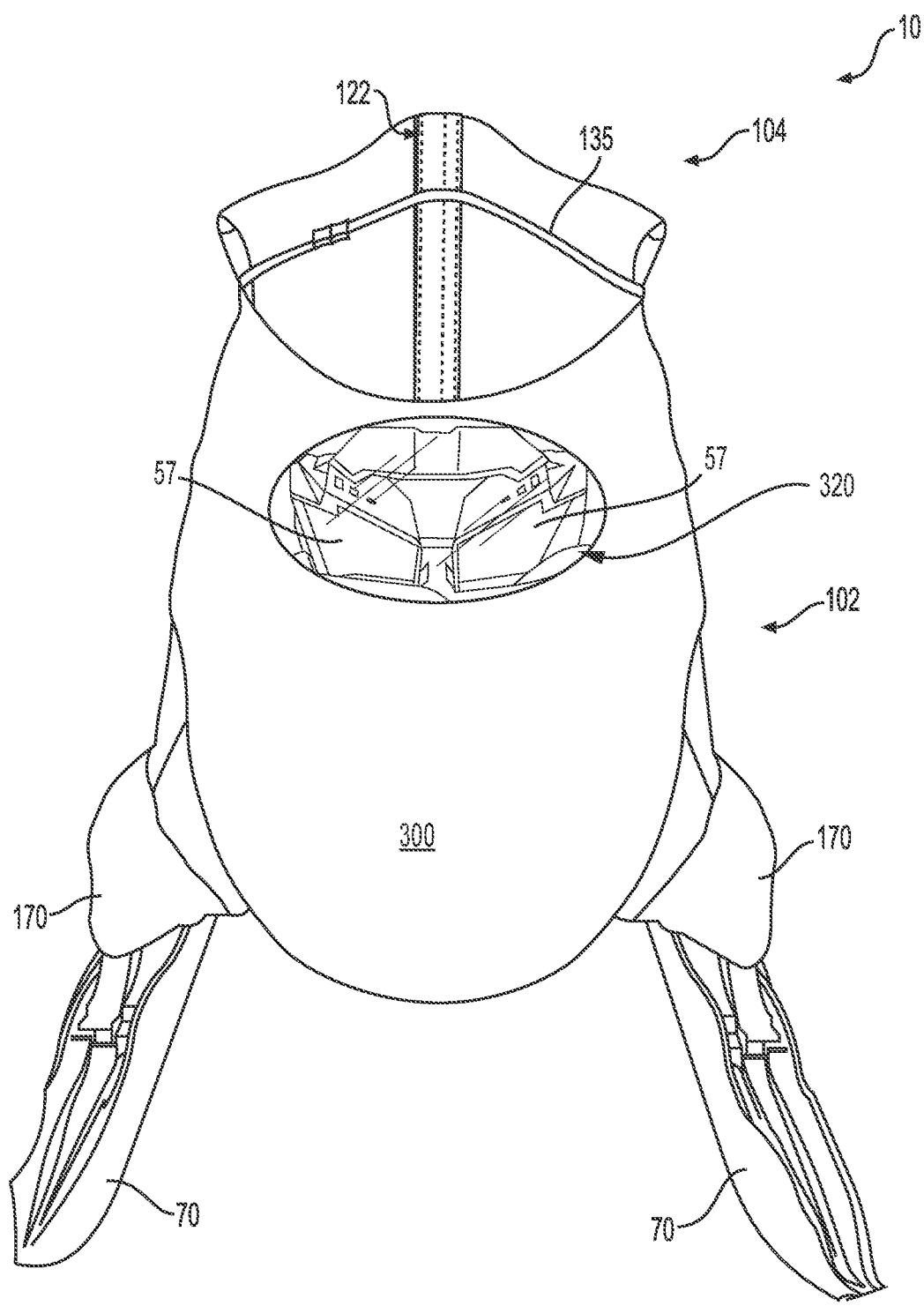
FIG. 20 is a top, front side perspective view of the snowmobile of FIG. 1 with another implementation of a protective cover installed thereon.

With reference to FIG. 20, another implementation of a protective cover 300 for the snowmobile 10 will be described. Portions of the cover 300 which are substantially similar to the cover 100 described above retain the same reference numerals and will not be described again here.

The cover 300 includes a headlight portion 320 in the forward portion 102. The headlight portion 320 is made from flexible plastic sheeting sewn or otherwise connected to the surrounding portions of the forward portion 102. It is contemplated that the headlight portion 320 could be made from other transparent materials or from materials that are only partially transparent, such as a translucent materials or hydrophobic mesh. For example, the material of the headlight portion 320 could be such that light from the headlights 57 could shine through the cover 300, while not being sufficiently transparent to see the details of the headlights 57 from outside the cover 300 when the headlights 57 are turned off.

In the illustrated implementation, the headlight portion 320 is larger than the headlights 57. In some implementations, the headlight portion 320 could be smaller than illustrated. In some cases, the headlight portion 320 could be two headlight portions 320, one being disposed generally forward of each one of the headlights 57.

Figure 21:
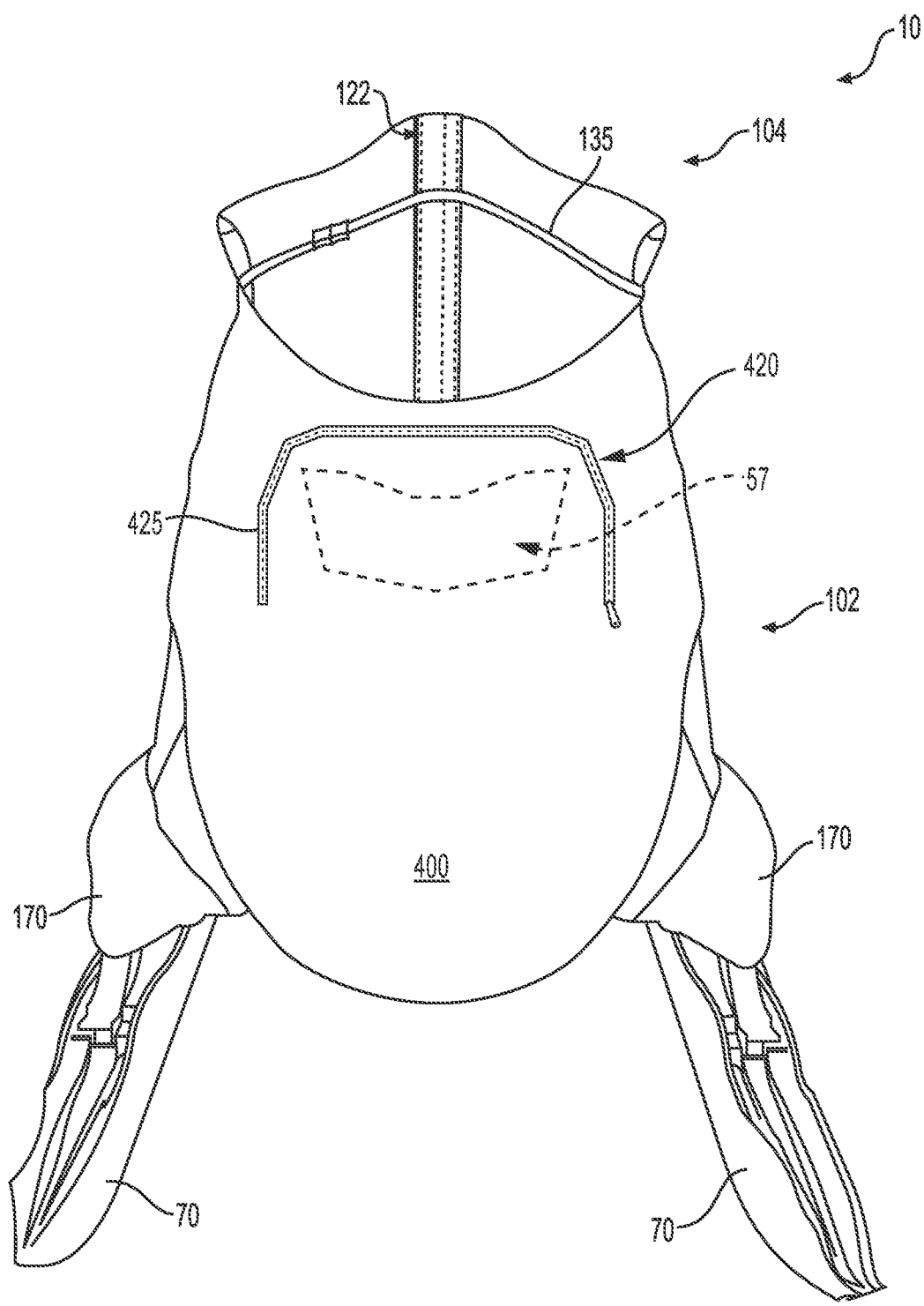
FIG. 21 is a top, front side perspective view of the snowmobile of FIG. 1 with yet another implementation of a protective cover installed thereon.
Figure 22:
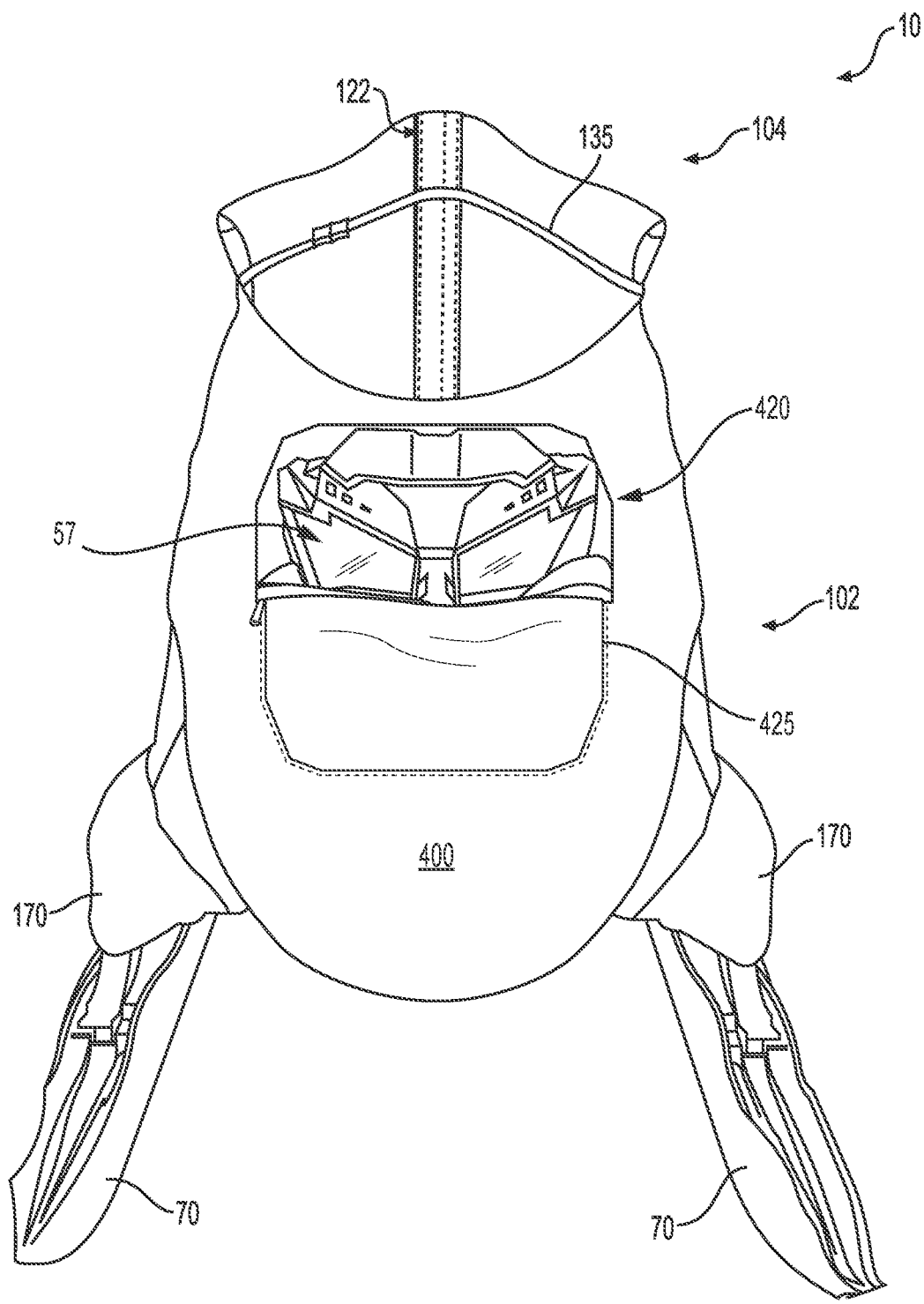
FIG. 22 is the top, front side perspective view of FIG. 21, with a headlight slit of the protective cover having been opened.

With reference to FIGS. 21 and 22, another implementation of a protective cover 400 for the snowmobile 10 will be described. Portions of the cover 400 which are substantially similar to the cover 100 described above retain the same reference numerals and will not be described again here.

The forward portion 102 of the cover 400 defines a headlight slit 420. The headlight slit 420 is selectively closed by at least one fastener 425, as is illustrated in FIG. 21. The headlight slit 420 is sized, shaped, and located to allow the headlights 57 of the snowmobile 10 to be uncovered when the headlight slit 420 is opened (when the cover 400 is installed on the snowmobile 10). In the illustrated implementation, the headlight slit 420 extends over and around the headlights 57. When the headlight slit 420 is open, as is illustrated in FIG. 22, a portion of the front portion 102 forms a flap that can be folded down below the headlights 57, allowing the headlights 57 to shine out through the cover 400.

It is contemplated that the headlight slit 420 could be larger or smaller than illustrated. In such cases, for example, the headlight slit 420 may only be large enough to uncover one headlight 57 or portions of one or both of the headlights 57.

The fastener 425 of the present implementation is a zipper 425, but other types of fasteners are contemplated. The fastener 425 could be implemented in various forms, including but not limited to: snaps, buttons, hook and loop strips, and ties.

Figure 23:
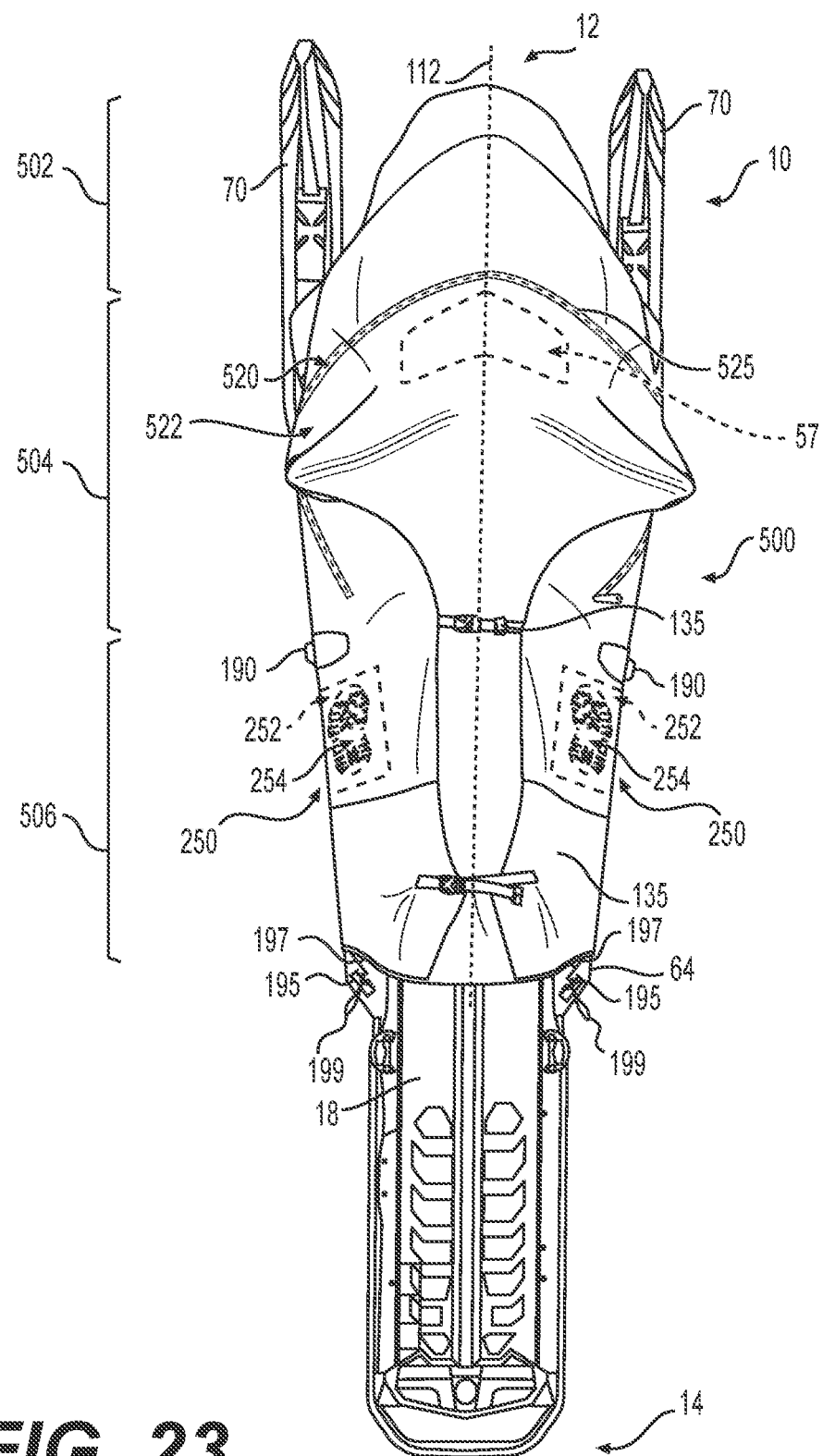
FIG. 23 is a top plan view of the snowmobile of FIG. 1 with yet another implementation of a protective cover installed thereon.

With reference to FIG. 23, yet another implementation of a protective cover 500 for the snowmobile 10 will be described. Portions of the cover 500 which are substantially similar to the cover 200 described above retain the same reference numerals and will not be described again here.

The cover 500 can be generally described as having three portions: a forward portion 502, an intermediate portion 504, and a rearward portion 506. It is contemplated that the portions 502, 504, 506 could be three cover sections that are sewn together. It is also contemplated that the cover 500 could be formed from more or less than three sections joined together. The forward, intermediate, and rearward portions 502, 504, 506 together cover a majority of the vehicle body 16, although the protective cover 500 could cover more or less of the vehicle body 16 and the snowmobile 10, as was described above with regards to the cover 200.

The intermediate portion 504 defines an aperture 520 for selectively accessing the handlebar 84 when the protective cover 500 is installed on the snowmobile 10. It is contemplated that the aperture 520 could extend partially into the forward or rearward portions 502, 506. In the present implementation, the aperture 520 is in the form of a generally U-shaped slit 520, extending generally forward from behind the handlebar 84, around a front side of the handlebar 84, and rearward around an opposite side of the handle 84. When the aperture 520 is opened, a flap 522 is formed. It is contemplated that the aperture 520 could be differently shaped, depending on the implementation. It is also contemplated that the aperture 520 could be larger or smaller than illustrated.

The aperture 520 is selectively closed by at least one fastener 525. The fastener 525 of the present implementation is a zipper 525, but other types of fasteners are contemplated. The fastener 525 could be implemented in various forms, including but not limited to: snaps, buttons, hook and loop strips, and ties.

To open the slit 520 to allow use of the handlebar 84, the fastener 525 is unfastened and the flap 522 is pulled generally upward and rearward to uncover the handlebar 84, as well as the front headlights 57 in the present implementation. As such, both the handlebar 84 and the headlights 57 are usable with the cover 500 installed on the vehicle 10. In some implementations, the headlights 57 may be partially obscured.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A protective cover for a vehicle, the protective cover comprising:
   a forward portion for covering at least a portion of at least one front cowl of the vehicle when installed thereon;
   a rearward portion for covering at least a portion of a seat of the vehicle when installed thereon; and
   an intermediate portion extending between the forward portion and the rearward portion for covering at least a handlebar of the vehicle when installed thereon,
   the intermediate portion defining an aperture for selectively accessing the handlebar when the protective cover is installed on the vehicle,
   the aperture being sized, shaped, and located to allow the intermediate portion to be pushed down around the handlebar such that the handlebar extends through and above the protective cover, the protective cover being configured such that the vehicle is capable of being moved under its own propulsion with the protective cover being installed thereon.

2. The protective cover of claim 1, wherein the intermediate portion includes a fastener for selectively closing the aperture.

3. The protective cover of claim 2, wherein the fastener is at least one of:
   a hook and loop system;
   a zipper; and
   a plurality of snaps.

4. The protective cover of claim 1, wherein the aperture extends laterally across the intermediate portion.

5. The protective cover of claim 4, wherein the aperture is at least as wide as a width of the handlebar of the vehicle.

6. The protective cover of claim 1, wherein the aperture extends longitudinally along a centerline of the protective cover.

7. The protective cover of claim 1, wherein:
the vehicle is a snowmobile including two front suspension assemblies connected between a vehicle body and two front skis; and
the protective cover further comprises two front leg portions for covering the two front suspension assemblies, the front leg portions being connected to and extending from at least one of the forward portion and the intermediate portion.

8. The protective cover of claim 1, wherein, when the protective cover is installed on the vehicle and the aperture is open, at least one of:
a gas filler cap; and
a handle for a rewind starter, is further accessible via the aperture.

9. The protective cover of claim 1, wherein the aperture is further sized, shaped, and located to allow the intermediate portion to be pushed down around at least one front headlight of the vehicle such that the handlebar and the at least one front headlight are usable with the protective cover being installed on the vehicle.

10. The protective cover of claim 1, wherein:
at least one of the intermediate portion and the rearward portion further comprises two foot-receiving portions, the two foot-receiving portions being on opposite sides of a longitudinal centerline of the cover; and
each one of the two foot-receiving portions includes at least one layer of material connected to the at least one of the intermediate portion and the rearward portion for reinforcing the foot-receiving portions.

11. The protective cover of claim 10, wherein the two foot-receiving portions provide visual indications on the protective cover of two suggested positions for two feet of the rider on the protective cover.

12. The protective cover of claim 10, wherein the at least one layer of material of each one of the two foot-receiving portions is connected to an underside of the at least one of the intermediate portion and the rearward portion.

13. The protective cover of claim 10, wherein the at least one layer of material of each one of the two foot-receiving portions comprises at least one layer of PVC coated material.

14. The protective cover of claim 10, wherein each one of the two foot-receiving portions is disposed over a corresponding footrest of the vehicle when the cover is installed on the vehicle.

15. The protective cover of claim 14, wherein each one of the two foot-receiving portions cover at least a portion of an exterior edge of the corresponding footrest of the vehicle when the cover is installed on the vehicle.

16. The protective cover of claim 1, wherein:
the forward portion includes a headlight portion disposed generally forward of at least one headlight of the vehicle when the cover is installed on the vehicle; and
the headlight portion is at least partially transparent.

17. The protective cover of claim 1, wherein:
the forward portion defines at least one headlight slit selectively closed by at least one fastener; and
the at least one headlight slit is sized, shaped, and located to allow at least one headlight of the vehicle to be at least partially uncovered when the cover is installed on the vehicle and the at least one headlight slit is opened.

18. The protective cover of claim 1, wherein:
the vehicle is a snowmobile including a vehicle body and two front skis; and
the protective cover is configured such that the two front skis are capable of being turned using the handlebar with the protective cover being installed on the snowmobile.

19. The protective cover of claim 1, wherein:
the vehicle is a snowmobile including a vehicle body and two front skis;
the forward portion of the protective cover wraps around a front end of the snowmobile; and
the protective cover does not cover the front skis such that the two front skis are unimpeded by the protective cover installed on the snowmobile.

20. A protective cover for a vehicle, the protective cover comprising:
a forward portion for covering at least a portion of at least one front cowl of the vehicle when installed thereon, the forward portion passing at least partially under a vehicle body of the vehicle when installed thereon;
a rearward portion for covering at least a portion of a seat of the vehicle when installed thereon; and
an intermediate portion extending between the forward portion and the rearward portion for covering at least a handlebar of the vehicle when installed thereon,
at least a portion of at least one of the forward portion, the rearward portion, and the intermediate portion defining an aperture for selectively accessing a portion of a top surface of the vehicle,
the aperture being sized, shaped, and located to allow access to a forward storage compartment of the vehicle, a handle for a rewind starter of the vehicle, and the handlebar when the protective cover is installed on the vehicle,
the forward storage compartment, the handle for the rewind starter, and the handlebar being usable via the aperture when opened, the protective cover being configured such that the vehicle is capable of being moved under its own propulsion with the protective cover being installed thereon.

21. The protective cover of claim 20, wherein:
the intermediate portion includes a fastener for selectively closing the aperture; and
the fastener is at least one of:
a zipper,
a hook and loop system, and
a plurality of snaps.

22. The protective cover of claim 20, wherein the aperture defines a flap to be pulled over the handlebar to expose the handlebar when the aperture is opened.

23. The protective cover of claim 20, wherein the aperture is a slit extending longitudinally along a centerline of the protective cover.

24. The protective cover of claim 20, wherein:
the vehicle is a snowmobile including two front suspension assemblies connected between the vehicle body and two front skis; and
the protective cover further comprises two front leg portions for covering the two front suspension assemblies, the front leg portions being connected to and extending from at least one of the forward portion and the intermediate portion.

25. The protective cover of claim 20, wherein the aperture is further sized, shaped, and located to allow use of the at least one front headlight with the protective cover being installed on the vehicle.

26. A protective cover for a vehicle, the protective cover comprising:
   a forward portion for covering at least a portion of at least one front cowl of the vehicle when installed thereon, the forward portion passing at least partially under a vehicle body of the vehicle when installed thereon;
   a rearward portion for covering at least a portion of a seat of the vehicle when installed thereon; and
   an intermediate portion extending between the forward portion and the rearward portion for covering at least a handlebar of the vehicle when installed thereon,
   the intermediate portion including a first edge and a second edge defining a slit for selectively accessing the handlebar when the protective cover is installed on the vehicle, the first edge and the second edge being connected to ends of the slit,
   the slit being sized, shaped, and located to allow the intermediate portion to be pushed down around the handlebar such that the handlebar extends through the slit and above the protective cover, the protective cover being configured such that the vehicle is capable of being moved under its own propulsion with the protective cover being installed thereon.

27. The protective cover of claim 26, wherein the first edge and the second edge overlap when the slit is closed.

28. The protective cover of claim 26, wherein a length of the slit is greater than a width of the handlebar.

29. The protective cover of claim 26, wherein:
   the intermediate portion includes a fastener for selectively closing the slit; and
   the fastener is at least one of:
      a zipper,
      a hook and loop system, and
      a plurality of snaps.

30. The protective cover of claim 26, wherein the aperture is further sized, shaped, and located to allow the intermediate portion to be pushed down around at least one front headlight of the vehicle such that the handlebar and the at least one front headlight are usable with the protective cover being installed on the vehicle.

31. The protective cover of claim 30, wherein:
   at least the intermediate portion is formed from at least a first material and a second material, the first and second materials being different materials; and
   at least one of the first material and the second material is a stretchable material.

32. A protective cover for a snowmobile including two front skis, the protective cover comprising:
   a forward portion for covering at least a portion of at least one front cowl of the snowmobile when installed thereon;
   a rearward portion for covering at least a portion of a seat of the snowmobile when installed thereon; and
   an intermediate portion extending between the forward portion and the rearward portion for covering at least a handlebar of the snowmobile when installed thereon,
   the intermediate portion defining an aperture for selectively accessing the handlebar when the protective cover is installed on the snowmobile,
   the aperture being sized, shaped, and located to allow the intermediate portion to be pushed down around the handlebar such that the handlebar extends through and above the protective cover, the protective cover being configured such that the front skis are capable of being turned using the handlebar to steer the snowmobile in a direction other than forward with the protective cover being installed on the snowmobile, the front skis being uncovered and unimpeded by the protective cover when installed on the snowmobile.

* * * * *